US012069740B2

(12) United States Patent
Yuan et al.

(10) Patent No.: US 12,069,740 B2
(45) Date of Patent: Aug. 20, 2024

(54) RANDOM ACCESS RESOURCE CONFIGURATION METHOD AND APPARATUS

(71) Applicant: HUAWEI TECHNOLOGIES CO., LTD., Guangdong (CN)

(72) Inventors: Shitong Yuan, Chengdu (CN); Fengwei Liu, Chengdu (CN); Jing Qiu, Chengdu (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 419 days.

(21) Appl. No.: 17/371,895

(22) Filed: Jul. 9, 2021

(65) Prior Publication Data
US 2021/0337605 A1 Oct. 28, 2021

Related U.S. Application Data

(63) Continuation of application No. PCT/CN2020/071448, filed on Jan. 10, 2020.

(30) Foreign Application Priority Data

Jan. 11, 2019 (CN) .......................... 201910028792.6

(51) Int. Cl.
*H04W 74/0833* (2024.01)
*H04W 72/0446* (2023.01)
(Continued)

(52) U.S. Cl.
CPC ... *H04W 74/0841* (2013.01); *H04W 72/0446* (2013.01); *H04W 72/27* (2023.01); *H04W 72/51* (2023.01)

(58) Field of Classification Search
CPC ......... H04W 74/0841; H04W 72/0446; H04W 72/27; H04W 72/51; H04W 74/008;
(Continued)

(56) References Cited

U.S. PATENT DOCUMENTS

2010/0195607 A1* 8/2010 Lee .................. H04W 74/0866
370/329
2012/0320842 A1* 12/2012 Jeong ................ H04W 74/006
370/329
(Continued)

FOREIGN PATENT DOCUMENTS

CN 106301688 A 1/2017
CN 106358301 A 1/2017
(Continued)

OTHER PUBLICATIONS

Office Action issued in Chinese Application No. 201910028792.6 on May 11, 2022, 10 pages.
(Continued)

*Primary Examiner* — Afshawn M Towfighi
(74) *Attorney, Agent, or Firm* — Fish & Richardson P.C.

(57) ABSTRACT

This present disclosure discloses example random access resource configuration methods, mediums, and apparatuses. One example method includes receiving, by a first network device, configuration information of a first physical random access channel (PRACH) resource. Location adjustment information is received by the first network device, where the location adjustment information is used to indicate to adjust a location of at least a part of the first PRACH resource. A second PRACH resource is determined by the first network device based on the configuration information of the first PRACH resource and the location adjustment information. A random access request is sent by the first network device to a second network device on the second PRACH resource.

20 Claims, 9 Drawing Sheets

(51) Int. Cl.
*H04W 72/27* (2023.01)
*H04W 72/51* (2023.01)

(58) Field of Classification Search
CPC .... H04W 72/53; H04W 72/20; H04L 5/0007; H04L 5/0091
See application file for complete search history.

(56) References Cited

U.S. PATENT DOCUMENTS

| | | | | |
|---|---|---|---|---|
| 2013/0343296 | A1* | 12/2013 | Dinan | H04W 72/21 370/329 |
| 2017/0265223 | A1* | 9/2017 | Zhang | H04W 74/0833 |
| 2020/0296635 | A1* | 9/2020 | Rastegardoost | H04W 72/23 |
| 2021/0029658 | A1* | 1/2021 | Mahalingam | H04W 56/0045 |
| 2021/0337605 | A1* | 10/2021 | Yuan | H04W 74/008 |
| 2022/0095385 | A1* | 3/2022 | Yi | H04W 74/0833 |

FOREIGN PATENT DOCUMENTS

| | | |
|---|---|---|
| CN | 108696938 A | 10/2018 |
| CN | 111432500 A | 7/2020 |
| CN | 112970322 A | 6/2021 |
| CN | 113303017 A | 8/2021 |

OTHER PUBLICATIONS

Qualcomm Incorporated, "Enhancements to support NR backhaul links," 3GPP TSG RAN WG1 Meeting #95, R1-1813417, Spokane, USA, Nov. 12-16, 2018, 16 pages.

3GPP TS 38.211 V15.3.0 (Sep. 2018), "3rd Generation Partnership Project; Technical Specification Group Radio Access Network; NR; Physical channels and modulation (Release 15)," Sep. 2018, 96 pages.

3GPP TS 38.213 V15.3.0 (Sep. 2018), "3rd Generation Partnership Project; Technical Specification Group Radio Access Network; NR; Physical layer procedures for control (Release 15)," Sep. 2018, 101 pages.

3GPP TS 38.331 V15.3.0 (Sep. 2018), "3rd Generation Partnership Project; Technical Specification Group Radio Access Network;NR; Radio Resource Control (RRC) protocol specification (Release 15)", Sep. 2018, 445 pages.

Qualcomm Incorporated, "Enhancements to support NR backhaul links," 3GPP TSG RAN WG1 Meeting #94b, R1-1811256, Chengdu, China, Oct. 8-12, 2018, 17 pages.

Nokia et al., "NR enhancements to support IAB," 3GPP TSG RAN WG1 Meeting #95, R1-1812700, Spokane, WA, USA, Nov. 23-26, 2018, 9 pages.

Samsung, "Necessary Enhancements for NR IAB," 3GPP TSG RAN WG1 Meeting #95, R1-1812981, Spokane, USA, Nov. 12-16, 2018, 9 pages.

3GPP TR 38.874 1.0.0 (Nov. 2018), "3rd Generation Partnership Project; Technical Specification Group Radio Access Network; Study on Integrated Access and Backhaul; (Release 15)," Nov. 2018, total 110 pages.

PCT International Search Report and Written Opinion in International Application No. PCT/CN2020/071448, dated Mar. 26, 2020, 17 pages.

Extended European Search Report issued in European Application No. 20738686.3 on Feb. 10, 2022, 9 pages.

Intel Corporation, "PHY layer enhancements for NR IAB," 3GPP TSG RAN WG1 #94bis, R1-1810770, Chengdu, China, Oct. 8-12, 2018, 13 pages.

Samsung, "Necessary Enhancements for NR IAB," 3GPP TSG RAN WG1 Meeting #94b, R1-1810864, Chengdu, China, Oct. 8-12, 2018, 12 pages.

* cited by examiner

RANDOM ACCESS RESOURCE CONFIGURATION METHOD AND APPARATUS

CROSS-REFERENCE TO RELATED APPLICATION

This application is a continuation of International application No. PCT/CN2020/071448, filed on Jan. 10, 2020, which claims priority to Chinese Patent Application No. 201910028792.6, filed on Jan. 11, 2019. The disclosures of the aforementioned applications are hereby incorporated by reference in their entireties.

TECHNICAL FIELD

Embodiments of this application relate to the communications field, and more specifically, to a random access resource configuration method and an apparatus.

BACKGROUND

In an integrated access and backhaul (integrated access and backhaul, IAB) network, an access link is a link used by a network device to provide an access service for a terminal, and a backhaul link is a link used by network devices to exchange information and data with each other. A total quantity of physical random access channel (physical random access channel, PRACH) resources is fixed for the access link and the backhaul link. Because an IAB node needs to access an upper-level node, and also needs to receive a random access preamble sent by a terminal served by the IAB node or a lower-level IAB node, a resource needs to be configured on the access link to receive a random access request sent by user equipment (user equipment, UE), and a random access request needs to be sent on the backhaul link to access the upper-level node. However, an IAB node that supports half-duplex (half duplexing) may not be capable of performing random access on the backhaul link while receiving the random access request sent by the UE on the access link.

How to configure random access resources on the access link and the backhaul link for the IAB node is a problem to be resolved.

SUMMARY

Embodiments of this application provide a random access resource configuration method and an apparatus, to resolve a configuration problem that occurs when random access resources of a network device collide on an access link and a backhaul link.

According to a first aspect, a random access resource configuration method is provided. The method includes: A first network device receives configuration information of a first physical random access channel PRACH resource; the first network device receives location adjustment information, where the location adjustment information is used to indicate to adjust a location of at least a part of the first PRACH resource; the first network device determines a second PRACH resource based on the configuration information of the first PRACH resource and the location adjustment information; and the first network device sends a random access request to a second network device on the second PRACH resource.

In the technical solutions in this application, the first network device can adjust the configured first PRACH resource in, for example, slots or symbols, and perform random access by using the second PRACH resource obtained after the adjustment. In this way, for example, when random access resources on an access link and a backhaul link collide, the random access resources on the two links can be time-staggered. In this way, a configuration problem that occurs when the random access resources of the network device collide on the access link and the backhaul link is resolved.

Specifically, after receiving the configuration information of the first PRACH resource, the first network device does not directly send the random access request by using the first PRACH resource, but adjusts the first PRACH resource in slots or symbols based on the received location adjustment information, to obtain the second PRACH resource, and then sends the random access request by using the second PRACH resource on the backhaul link. Adjusting a time domain location of the first PRACH resource may change a time of using the random access resource by the network device on the backhaul link, and may stagger the time and a time of using a random access resource by the network device on another link. In this way, the configuration problem that occurs when the random access resources of the network device collide on the access link and the backhaul link is resolved.

It should be understood that, in this embodiment of this application, the second PRACH resource is used by the first network device to send the random access request to the second network device. The first PRACH resource and a third PRACH resource that is configured by the first network device for a terminal or a child node of the first network device overlap in time domain. The third PRACH resource and the second PRACH resource that is obtained after the first PRACH resource is adjusted based on the location adjustment information do not overlap in time domain.

It should be further understood that, in this embodiment of this application, overlapping in time domain includes: The first PRACH resource and the third PRACH resource occupy some same slots or some same symbols in some slots, or occupy same time corresponding to some symbols in some slots.

Optionally, the location adjustment information is used to indicate to adjust the location of at least the part of the first PRACH resource in slots or symbols.

With reference to the first aspect, in a possible implementation, the location adjustment information includes a slot or symbol offset; and that the first network device determines a second PRACH resource based on the configuration information of the first PRACH resource and the location adjustment information includes:

The first network device offsets at least the part of the first PRACH resource based on the slot or symbol offset, to obtain the second PRACH resource.

The slot-level or symbol-level offset is introduced to offset the first PRACH resource in slots or symbols to obtain the second PRACH resource, so that slots or symbols in which the first network device uses the random access resource on the backhaul link are staggered with slots or symbols in which the first network device uses the random access resource on the another link. This avoids a PRACH resource collision in the slots or the symbols, and may satisfy a half-duplex constraint on the first network device. In addition, the method may be further applicable to a case in which a PRACH resource is configured in each system frame. Offsetting the PRACH resource in slots or symbols in the system frame can improve resource utilization.

It should be understood that when different waveform parameters are used for PRACHs on the access link and the backhaul link, slot numbers are different, but locations of time domain resources that correspond to different slots and that are on the access link and the backhaul link may be the same, and a collision also exists. In this case, a resource that is in a symbol of the first PRACH resource and that collides with the third PRACH resource in time domain may be offset to avoid the collision.

It should be understood that the slot or symbol offset is a positive offset or a negative offset. The positive offset indicates a backward offset, and the negative offset indicates a forward offset. Alternatively, the positive offset indicates a forward offset, and the negative offset indicates a backward offset.

With reference to the first aspect, in a possible implementation, the second PRACH resource is obtained after all resources in the first PRACH resource are offset based on the slot or symbol offset.

When the PRACH resource used by the first network device on the backhaul link and the PRACH resource used on the another link completely overlap in slots or symbols, the location adjustment information may be used to indicate to offset all the resources in the first PRACH resource in slots or symbols. In this way, the configuration problem that occurs when the random access resources of the first network device collide on the backhaul link and the access link can be resolved.

With reference to the first aspect, in a possible implementation, the location adjustment information further includes location information of a target slot or symbol; and that the first network device offsets at least the part of the first PRACH resource based on the slot or symbol offset, to obtain the second PRACH resource includes:

offsetting a PRACH resource in the target slot or symbol to obtain the second PRACH resource, where the second PRACH resource includes the resource that is in the first PRACH resource and that has been offset and a resource that is in the first PRACH resource and that is not offset.

With reference to the first aspect, in a possible implementation, the target slot or symbol is a slot or symbol in which the first PRACH resource collides with the third PRACH resource, or all slots or symbols in which the first PRACH resource is configured.

It should be understood that a "collision slot" or a "collision symbol" in this embodiment of this application indicates that both the first PRACH resource and the third PRACH resource are configured in the collision slot or the collision symbol.

With reference to the first aspect, in a possible implementation, the target slot or symbol is determined by an upper-level node of the first network device or a donor node.

With reference to the first aspect, in a possible implementation, that the first network device offsets at least the part of the first PRACH resource based on the slot or symbol offset, to obtain the second PRACH resource includes:

The first network device determines a target slot or symbol in which the first PRACH resource collides with the third PRACH resource in time domain, where the third PRACH resource is used by the first network device to receive a random access request; and offsets a PRACH resource in the target slot or symbol to obtain the second PRACH resource, where the second PRACH resource includes the resource that is in the first PRACH resource and that has been offset and a resource that is in the first PRACH resource and that is not offset.

The location adjustment information may be used to indicate to offset the PRACH resource in the target slot or symbol. In other words, only the PRACH resource in a part of slots or symbols is offset. When only the PRACH resource in the collision slot or the collision symbol is offset, another slot or symbol in which no collision occurs may not be affected. This improves resource utilization.

With reference to the first aspect, in a possible implementation, the location adjustment information includes an offset of a start symbol index of a PRACH occasion, and the first network device offsets the entire PRACH occasion based on the offset of the start symbol index of the PRACH occasion, to obtain the second PRACH resource.

With reference to the first aspect, in a possible implementation, if the PRACH occasion is offset beyond a current slot or offset to a next slot, a PRACH resource moved beyond symbols in the current slot is no longer valid, and a PRACH resource that is still in a symbol in the current slot after the offset is still valid.

When the location adjustment information includes the offset of the start symbol index of the PRACH occasion, the location adjustment information may be used to indicate to offset the entire PRACH occasion based on the offset. Offsetting the entire PRACH occasion has higher efficiency. In addition, the PRACH occasion moved beyond the current slot is considered as invalid, and the first network device cannot use a PRACH occasion in a symbol of the PRACH occasion, so that impact on resource configuration in another slot can be avoided.

It should be understood that "valid" in this embodiment of this application indicates that the first network device can use a PRACH resource in a valid slot or symbol indicated by the location adjustment information, and "invalid" indicates that the first network device cannot use a PRACH resource in an invalid slot or symbol indicated by the location adjustment information, or no longer maps an RO to a corresponding location, or does not use a PRACH resource in a slot or symbol other than a valid slot or symbol indicated by the location adjustment information.

With reference to the first aspect, in a possible implementation, the location adjustment information includes a slot index and/or a symbol index, and the slot index and/or the symbol index are/is used to indicate that at least a part of the first PRACH resource is valid; and that the first network device determines a second PRACH resource based on the configuration information of the first PRACH resource and the location adjustment information includes:

The first network device determines at least the part that is of the first PRACH resource and that is indicated by the slot index and/or the symbol index, as the second PRACH resource.

The slot or symbol index is used to indicate the valid PRACH resource that can be used by the first network device, so that the configuration problem of the random access resources of the first network device is resolved, and impact on resource configuration in another slot or symbol in which another resource is configured can be avoided.

With reference to the first aspect, in a possible implementation, the location adjustment information includes information about an unavailable slot, and the information about the unavailable slot is used to indicate the first network device to use a first PRACH resource in a slot other than the unavailable slot, or indicate that the first network device cannot use a PRACH resource in the unavailable slot.

With reference to the first aspect, in a possible implementation, the location adjustment information includes information about an unavailable system frame, and the information about the unavailable system frame is used to indicate the first network device to use a first PRACH resource in a system frame other than the unavailable system frame, or indicate that the first network device cannot use a PRACH resource in the unavailable system frame.

With reference to the first aspect, in a possible implementation, the location adjustment information includes an index of an available symbol, and the index of the available symbol is used to indicate that the first network device can use a PRACH resource in a symbol corresponding to the index of the available symbol.

With reference to the first aspect, in a possible implementation, the location adjustment information includes an index of an available symbol in a collision slot, and the index of the available symbol in the collision slot is used to indicate that the first network device can use a PRACH resource in a symbol corresponding to the index of the available symbol in the collision slot, and a PRACH resource in a slot other than the collision slot.

With reference to the first aspect, in a possible implementation, the location adjustment information further includes an index of a collision slot.

With reference to the first aspect, in a possible implementation, the location adjustment information includes an index of an unavailable symbol, and the index of the unavailable symbol is used to indicate that the first network device cannot use a PRACH resource in a symbol corresponding to the index of the unavailable symbol, or indicate the first network device to use a PRACH resource in a symbol other than a symbol corresponding to the index of the unavailable symbol.

With reference to the first aspect, in a possible implementation, the location adjustment information includes an index of an unavailable symbol in a collision slot, and the index of the unavailable symbol in the collision slot is used to indicate that the first network device cannot use a PRACH resource in a symbol corresponding to the index of the unavailable symbol in the collision slot.

With reference to the first aspect, in a possible implementation, the location adjustment information includes an index of an available slot, and the index of the available slot is used to indicate that the first network device can use a PRACH resource in a slot corresponding to the index of the available slot.

With reference to the first aspect, in a possible implementation, the location adjustment information includes a system frame offset and the slot offset.

In the technical solutions in this embodiment of this application, the system frame offset, the slot offset, and the symbol offset may be combined and selected. Appropriate location adjustment information may be selected for a specific case. At least two of the foregoing three types of information may alternatively be indicated together to the first network device. This ensures that the configuration problem that occurs when the random access resources of the first network device collide is resolved.

With reference to the first aspect, in a possible implementation, the configuration information of the first PRACH resource is carried in a system broadcast message or a radio resource control configuration message.

With reference to the first aspect, in a possible implementation, the configuration information of the first PRACH resource may be initially configured through a system message. When the configuration information of the first PRACH resource changes, the configuration information of the first PRACH resource is configured through an RRC configuration message.

With reference to the first aspect, in a possible implementation, the configuration information of the first PRACH resource is sent by the donor node, or the configuration information of the first PRACH resource is sent by the upper-level node of the first network device.

With reference to the first aspect, in a possible implementation, the configuration information of the first PRACH resource may be a PRACH configuration index.

With reference to the first aspect, in a possible implementation, the location adjustment information is sent by the upper-level node of the first network device or the donor node to the first network device.

With reference to the first aspect, in a possible implementation, the location adjustment information is determined by the donor node, the upper-level node of the first network device, or a core network device.

With reference to the first aspect, in a possible implementation, the first network device may be an IAB node, and the second network device may be the donor node or the upper-level node of the first network device.

With reference to the first aspect, in a possible implementation, the first network device may support half-duplex communication, or may support full-duplex communication.

According to a second aspect, a random access resource configuration method is provided. The method includes: A second network device obtains location adjustment information, where the location adjustment information is used to indicate to adjust a location of at least a part of a first physical random access channel PRACH resource; and the second network device sends the location adjustment information to a first network device.

The first PRACH resource is adjusted, for example, in slots or symbols, based on the location adjustment information, to change, for example, a slot or symbol location of the first PRACH resource, and also change a configuration of random access resources of the first network device that uses the adjusted first PRACH resource. Therefore, a collision between the random access resources used by the first network device is resolved.

Optionally, the location adjustment information is used to indicate to adjust the location of at least the part of the first PRACH resource in slots or symbols.

With reference to the second aspect, in a possible implementation, the second network device is a donor node; and that a second network device obtains location adjustment information includes: The second network device determines the location adjustment information and/or a second PRACH resource based on configuration information of the first PRACH resource and configuration information of a third PRACH resource, where the third PRACH resource is used by the first network device to receive a random access request, and the second PRACH resource is used to receive a random access request sent by the first network device.

With reference to the second aspect, in a possible implementation, the second network device is an upper-level node of the first network device; and that a second network device obtains location adjustment information includes:

The second network device determines the location adjustment information based on configuration information of the first PRACH resource and configuration information of a third PRACH resource, where the third PRACH resource is used by the first network device to receive a random access request.

That the second network device sends the location adjustment information to a first network device includes:

The second network device sends the location adjustment information to the first network device through a donor node, or the second network device directly sends the location adjustment information to the first network device.

With reference to the second aspect, in a possible implementation, the method further includes: The second network device receives the configuration information that is of the third PRACH resource and that is sent by the donor node or the first network device.

With reference to the second aspect, in a possible implementation, the second network device is an upper-level node of the first network device; and that a second network device obtains location adjustment information includes:

The second network device receives the location adjustment information sent by a donor node or a core network device.

With reference to the second aspect, in a possible implementation, that the second network device sends the location adjustment information to a first network device includes: The second network device forwards, through an air interface, the location adjustment information sent by the donor node or the core network device, or the second network device sends the location adjustment information to the first network device through an air interface.

With reference to the second aspect, in a possible implementation, the location adjustment information includes at least one of the following information: a slot offset, a symbol offset, a slot index, or a symbol index.

With reference to the second aspect, in a possible implementation, the method further includes: The second network device determines a second PRACH resource based on the configuration information of the first PRACH resource and the location adjustment information, where the second PRACH resource is used to receive a random access request sent by the first network device.

With reference to the second aspect, in a possible implementation, the location adjustment information includes the slot or symbol offset; and that the second network device determines a second PRACH resource based on the configuration information of the first PRACH resource and the location adjustment information includes:

The second network device offsets at least the part of the first PRACH resource based on the slot or symbol offset, to obtain the second PRACH resource.

The slot-level or symbol-level offset is introduced to offset the first PRACH resource in slots or symbols to obtain the second PRACH resource, so that slots or symbols that are determined by the second network device and in which a random access resource is used on a backhaul link are staggered with slots or symbols in which the first network device uses the random access resource on another link. This avoids a PRACH resource collision in the slots or the symbols. In addition, the method may be further applicable to a case in which a PRACH resource is configured in each system frame. Offsetting the PRACH resource in slots or symbols in the system frame can improve resource utilization.

It should be understood that when different waveform parameters are used for PRACHs on the access link and the backhaul link, slot numbers are different, but locations of time domain resources that correspond to different slots and that are on the access link and the backhaul link may be the same, and a collision also exists. In this case, a resource that is in a symbol of the first PRACH resource and that collides with the third PRACH resource in time domain may be offset to avoid the collision.

It should be understood that the slot or symbol offset is a positive offset or a negative offset. The positive offset indicates a backward offset, and the negative offset indicates a forward offset. Alternatively, the positive offset indicates a forward offset, and the negative offset indicates a backward offset.

With reference to the second aspect, in a possible implementation, the location adjustment information further includes location information of a target slot or symbol; and that the second network device offsets at least the part of the first PRACH resource based on the slot or symbol offset, to obtain the second PRACH resource includes:

offsetting a PRACH resource in the target slot or symbol to obtain the second PRACH resource, where the second PRACH resource includes the resource that is in the first PRACH resource and that has been offset and a resource that is in the first PRACH resource and that is not offset.

With reference to the second aspect, in a possible implementation, the target slot or symbol is a slot or symbol in which the first PRACH resource collides with the third PRACH resource.

It should be understood that a "collision slot" or a "collision symbol" in this embodiment of this application indicates that both the first PRACH resource and the third PRACH resource are configured in the collision slot or the collision symbol.

The location adjustment information may be used to indicate to offset the PRACH resource in the target slot or symbol. In other words, only the PRACH resource in a part of slots or symbols is offset. When only the PRACH resource in the collision slot or the collision symbol is offset, another slot or symbol in which no collision occurs may not be affected. This improves resource utilization.

With reference to the second aspect, in a possible implementation, the target slot or symbol is determined by the second network device or the donor node.

With reference to the second aspect, in a possible implementation, that the second network device offsets at least the part of the first PRACH resource based on the slot or symbol offset, to obtain the second PRACH resource includes:

The second network device determines a target slot or symbol in which the first PRACH resource collides with the third PRACH resource in time domain, where the third PRACH resource is used by the first network device to receive the random access request; and offsets a PRACH resource in the target slot or symbol to obtain the second PRACH resource, where the second PRACH resource includes the resource that is in the first PRACH resource and that has been offset and a resource that is in the first PRACH resource and that is not offset.

With reference to the second aspect, in a possible implementation, the location adjustment information includes an offset of a start symbol index of a PRACH occasion, and the second network device offsets the entire PRACH occasion based on the offset of the start symbol index of the PRACH occasion, to obtain the second PRACH resource.

With reference to the second aspect, in a possible implementation, if the PRACH occasion is offset beyond a current slot or offset to a next slot, a PRACH resource moved beyond symbols in the current slot is no longer valid, and a PRACH resource that is still in a symbol in the current slot after the offset is still valid.

When the location adjustment information includes the offset of the start symbol index of the PRACH occasion, the location adjustment information may be used to indicate to offset the entire PRACH occasion based on the offset. Offsetting the entire PRACH occasion has high efficiency. In addition, the PRACH occasion moved beyond the current slot is considered as invalid, and the second network device cannot use a PRACH occasion in a symbol of the PRACH occasion, so that impact on resource configuration in another slot can be avoided.

It should be understood that "valid" in this embodiment of this application indicates that the second network device can use a PRACH resource in a valid slot or symbol indicated by the location adjustment information, and "invalid" indicates that the second network device cannot use a PRACH resource in an invalid slot or symbol indicated by the location adjustment information, or no longer maps an RO to a corresponding location, or does not use a PRACH resource in a slot or symbol other than a valid slot or symbol indicated by the second network device.

With reference to the second aspect, in a possible implementation, the location adjustment information includes a slot index and/or a symbol index, and the slot index and/or the symbol index are/is used to indicate that at least a part of the first PRACH resource is valid; and that the second network device determines a second PRACH resource based on the configuration information of the first PRACH resource and the location adjustment information includes:

The second network device determines at least the part that is of the first PRACH resource and that is indicated by the slot index and/or the symbol index, as the second PRACH resource.

The slot or symbol index is used to indicate a valid PRACH resource that can be used by the second network device, so that impact on resource configuration in another slot or symbol in which another resource is configured can be avoided.

With reference to the second aspect, in a possible implementation, the location adjustment information includes information about an unavailable slot, and the information about the unavailable slot is used to indicate the second network device to use the first PRACH resource in a slot other than the unavailable slot, or indicate that the second network device cannot use a PRACH resource in the unavailable slot.

With reference to the second aspect, in a possible implementation, the location adjustment information includes information about an unavailable system frame, and the information about the unavailable system frame is used to indicate the second network device to use the first PRACH resource in a system frame other than the unavailable system frame, or indicate that the second network device cannot use a PRACH resource in the unavailable system frame.

With reference to the second aspect, in a possible implementation, the location adjustment information includes an index of an available symbol, and the index of the available symbol is used to indicate that the second network device can use a PRACH resource in a symbol corresponding to the index of the available symbol.

With reference to the second aspect, in a possible implementation, the location adjustment information includes an index of an available symbol in a collision slot, and the index of the available symbol in the collision slot is used to indicate that the second network device can use a PRACH resource in a symbol corresponding to the index of the available symbol in the collision slot, and a PRACH resource in a slot other than the collision slot.

With reference to the second aspect, in a possible implementation, the location adjustment information further includes an index of a collision slot.

With reference to the second aspect, in a possible implementation, the location adjustment information includes an index of an unavailable symbol, and the index of the unavailable symbol is used to indicate that the second network device cannot use a PRACH resource in a symbol corresponding to the index of the unavailable symbol, or indicate the second network device to use a PRACH resource in a symbol other than a symbol corresponding to the index of the unavailable symbol.

With reference to the second aspect, in a possible implementation, the location adjustment information includes an index of an unavailable symbol in a collision slot, and the index of the unavailable symbol in the collision slot is used to indicate that the second network device cannot use a PRACH resource in a symbol corresponding to the index of the unavailable symbol in the collision slot.

With reference to the second aspect, in a possible implementation, the location adjustment information includes an index of an available slot, and the index of the available slot is used to indicate that the second network device can use a PRACH resource in a slot corresponding to the index of the available slot.

With reference to the second aspect, in a possible implementation, the location adjustment information includes a system frame offset and the slot offset.

In the technical solutions in this embodiment of this application, the system frame offset, the slot offset, and the symbol offset may be combined and selected. Appropriate location adjustment information may be selected for a specific case. At least two of the foregoing three types of information may alternatively be indicated together to the second network device. This improves resource utilization.

With reference to the second aspect, in a possible implementation, the configuration information of the first PRACH resource is carried in a system broadcast message or a radio resource control configuration message.

With reference to the second aspect, in a possible implementation, the configuration information of the first PRACH resource may be initially configured through a system message. When the configuration information of the first PRACH resource changes, the configuration information of the first PRACH resource is configured through an RRC configuration message.

With reference to the second aspect, in a possible implementation, the first network device may be an IAB node, and the second network device may be the donor node or the upper-level node of the first network device.

With reference to the second aspect, in a possible implementation, that the second network device sends the location adjustment information to a first network device includes:

The second network device sends the location adjustment information to the first network device through an F 1 application protocol AP interface, a radio resource control RRC message, or a media access control control element MAC CE.

With reference to the second aspect, in a possible implementation, the second network device is another IAB node, and that the second network device sends the location adjustment information to a first network device includes: The second network device sends the location adjustment information to the first network device through a donor node, or directly sends the location adjustment information to the first network device. If the location adjustment information is generated by the second network device, the location adjustment information needs to be sent to the first network device through the donor node, or the location adjustment information may be directly sent to the first network device, for example, through the MAC CE.

It should be understood that a random access resource used by the second network device to receive the random access request sent by the first network device is the same as a random access resource used by the first network device to send the random access request to the second network device, and both are the second PRACH resource.

According to a third aspect, a communications apparatus is provided. The communications apparatus includes a module or a unit configured to perform the method according to any one of the first aspect or the possible implementations of the first aspect.

Optionally, the communications apparatus according to the third aspect may be the first network device mentioned above, or may be a component (for example, a chip or a circuit) used in the first network device.

According to a fourth aspect, a communications apparatus is provided. The communications apparatus includes a module or a unit configured to perform the method according to any one of the second aspect or the possible implementations of the second aspect.

Optionally, the communications apparatus in the fourth aspect may be the second network device mentioned above, or may be a component (for example, a chip or a circuit) used in the second network device.

According to a fifth aspect, a communications apparatus is provided. The communications apparatus includes at least one processor and a communications interface. The communications interface is used by the communications apparatus to exchange information with another communications apparatus. When a program instruction is executed in the at least one processor, the communications apparatus is enabled to implement a function of the foregoing first network device.

According to a sixth aspect, a communications apparatus is provided. The communications apparatus includes at least one processor and a communications interface. The communications interface is used by the communications apparatus to exchange information with another communications apparatus. When a program instruction is executed in the at least one processor, the communications apparatus is enabled to implement a function of the foregoing second network device.

According to a seventh aspect, a communications apparatus is provided. The communications apparatus includes a transceiver, a processor, and a memory. The processor is configured to control the transceiver to send and receive a signal. The memory is configured to store a computer program. The processor is configured to invoke the computer program from the memory and run the computer program, to enable the communications apparatus to perform the method according to any one of the first aspect or the possible implementations of the first aspect.

According to an eighth aspect, a communications apparatus is provided. The communications apparatus includes a transceiver, a processor, and a memory. The processor is configured to control the transceiver to send and receive a signal. The memory is configured to store a computer program. The processor is configured to invoke the computer program from the memory and run the computer program, to enable the communications apparatus to perform the method according to any one of the second aspect or the possible implementations of the second aspect.

According to a ninth aspect, a chip is provided. The chip is configured to perform the method according to any one of the first aspect or the possible implementations of the first aspect.

According to a tenth aspect, a chip is provided. The chip is configured to perform the method according to any one of the second aspect or the possible implementations of the second aspect.

According to an eleventh aspect, a computer-readable storage medium is provided. The computer-readable storage medium stores an instruction. When the instruction is run on a computer, the computer is enabled to perform the method according to any one of the first aspect or the possible implementations of the first aspect.

According to a twelfth aspect, a computer-readable storage medium is provided. The computer-readable storage medium stores an instruction. When the instruction is run on a computer, the computer is enabled to perform the method according to any one of the second aspect or the possible implementations of the second aspect.

According to a thirteenth aspect, a computer program product including an instruction is provided. When the computer program product runs on a computer, the computer is enabled to perform the method according to any one of the first aspect or the possible implementations of the first aspect.

According to a fourteenth aspect, a computer program product including an instruction is provided. When the computer program product runs on a computer, the computer is enabled to perform the method according to any one of the second aspect or the possible implementations of the second aspect.

According to a fifteenth aspect, a communications system is provided. The communications system includes the foregoing first network device and second network device.

DESCRIPTION OF EMBODIMENTS

The following describes the technical solutions in this application with reference to the accompanying drawings.

Figure 1:
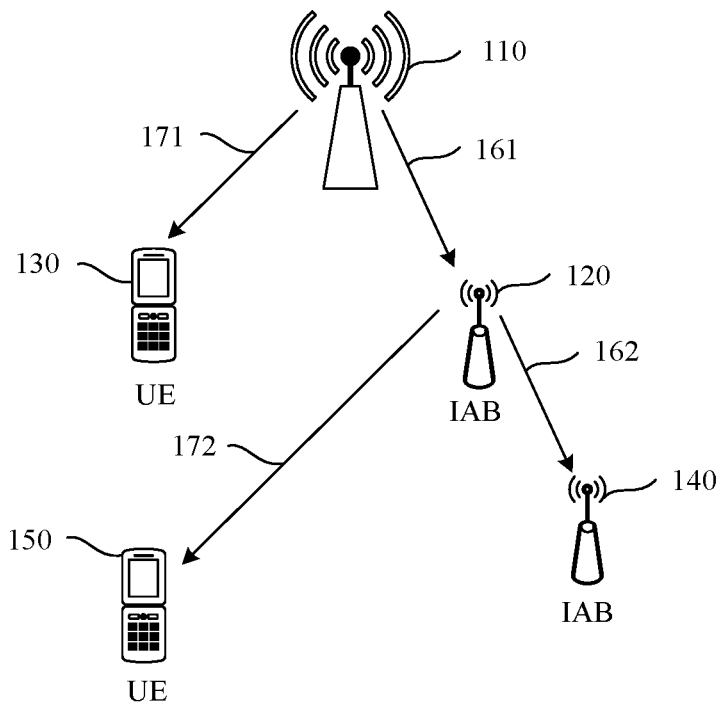
FIG. 1 is a schematic diagram of an application scenario according to an embodiment of this application.

FIG. 1 is a schematic diagram of an application scenario according to an embodiment of this application. As shown in FIG. 1, the application scenario may include a donor node 110, relay stations 120 and 140, and terminals 130 and 150.

The donor node 110, also referred to as a donor station, is a base station obtained after a relay (Relay) function is added to a common base station. The donor node 110 supports access of a common terminal such as the terminal 130, and also supports access of a relay station such as the relay station 120. The base station may be configured to connect a terminal device to a wireless network (radio access network, RAN). Therefore, the base station may also be referred to as an access network device or an access network node sometimes. It may be understood that in systems using different radio access technologies, names of devices having functions of the base station may be different. For ease of description, in the embodiments of this application, apparatuses that provide a radio access function for the terminal are collectively referred to as a base station. In the embodiments of this application, the common base station may be an evolved NodeB (evolved NodeB, eNB) in a long term evolution (long term evolution, LTE) network, and the donor node 110 may be represented as a DeNB (donor eNodeB, DeNB). Alternatively, the common base station may be a next-generation node base station (next generation node base station, gNB) in a fifth generation (the fifth generation, 5G) mobile communications system, and the donor node 110 may be represented as a DgNB (donor gNodeB, DgNB). Alternatively, the common base station may be another device having the functions of the base station, a network device in a 5G network, or the like. The donor node 110 may be a macro base station, or may be a micro base station. A coverage area of one donor node 110 may include one cell, or may include a plurality of cells. For example, a cell covered by the donor node may be referred to as a donor cell, donor cells may cover different directions, and each donor cell may be accessed by a specific quantity of relay stations and terminals.

The relay station 120 is configured to provide a wireless backhaul service for the donor node 110. The relay station 120 may access the donor node 110 through a radio signal and establish an air interface bearer, and may further support access of a terminal, for example, the terminal 150, in a coverage area of the relay station 120. The relay station may also be referred to as a wireless backhaul device, a relay device, a substation, a child node, or the like. In a 5G system, the relay station may be referred to as an integrated access and backhaul (integrated access and backhaul, IAB) device or an IAB node. Relay stations may be concatenated (to form multiple hops). For example, the relay station 120 and the relay station 140 shown in FIG. 1 are concatenated. The relay station 120 supports access of the terminal 150 and also supports access of the relay station 140. In this scenario, the relay station 120 may be referred to as a parent node or an upper-level node of the relay station 140, and the relay station 140 may be referred to as a child node or a lower-level node of the relay station 120. The relay station 140 may further have a child node (not shown in the figure) of the relay station 140. It should be understood that the parent node and the child node, and the upper-level node and the lower-level node are all relative concepts. For example, a relay station may be a child node of a parent node of the relay station, or may be a parent node of a child node of the relay station. For ease of description, in the embodiments of this application, an example in which the relay stations 120 and 140 are IAB nodes is used for description.

The terminals 130 and 150 each may communicate with one or more core networks (core network, CN) through a base station. The terminal device may also be referred to as user equipment (user equipment, UE), an access terminal, a terminal, a subscriber unit, a subscriber station, a mobile station, a mobile station, a remote station, a remote terminal, a mobile device, a user terminal, a wireless network device, a user agent, or a user apparatus. The terminal may be a cellular phone (cellular phone), a cordless phone, a session initiation protocol (session initiation protocol, SIP) phone, a smartphone (smartphone), a wireless local loop (wireless local loop, WLL) station, a personal digital assistant (personal digital assistant, PDA), a handheld device having a wireless communication function, a computing device, another device connected to a wireless modem, a vehicle-mounted device, a wearable device, a drone device, a terminal in the Internet of Things or the Internet of Vehicles, a terminal in any form in a future network, relay user equipment, a terminal in a future evolved public land mobile network (public land mobile network, PLMN), or the like. This is not limited in the embodiments of this application. For ease of description, in the embodiments of this application, the terminal devices that access the network are collectively referred to as a terminal. In some embodiments, the terminal may alternatively be identified by UE. The terminal may directly access the donor node, or may access the relay station. As shown in FIG. 1, the terminal 130 directly accesses the donor node 110, and the terminal 150 accesses the relay station 120. Alternatively, the terminal 130 may access the relay station, and the terminal 150 may access the donor node. Access statuses of the terminals in the figure are merely examples.

In an integrated access and backhaul IAB network, a link used by a network device to provide an access service for a common terminal is an access link, and a link used by network devices to exchange information and data is a backhaul link. As shown in FIG. 1, both a communications link 171 between the terminal 130 and the donor node 110 and a communications link 172 between the terminal 150 and the relay station 120 are access links, and both a communications link 161 between the donor node 110 and the relay station 120 and a communications link 162 between the relay station 120 and the relay station 140 are backhaul links. The information and the data exchanged over the backhaul link may include signaling and data that are sent by a core network or an upper-level network device node and that are necessary for working of the network device, and also include data and signaling of the terminal. In the embodiments of this application, "two links" refer to an access link and a backhaul link, or refer to two backhaul links.

It should be noted that quantities of donor nodes, relay stations, and terminals in FIG. 1 are merely examples for description, and constitute no limitation on the embodiments of this application. In addition, names of the nodes or devices are merely examples. In a specific implementation, the nodes or devices in this system architecture may alternatively have other names. This is not specifically limited in the embodiments of this application.

It should be understood that the embodiments of this application are not limited to the system architecture shown in FIG. 1. For example, an application scenario in which the technical solutions in the embodiments of this application may be used may include more or fewer nodes or devices.

Figure 2:
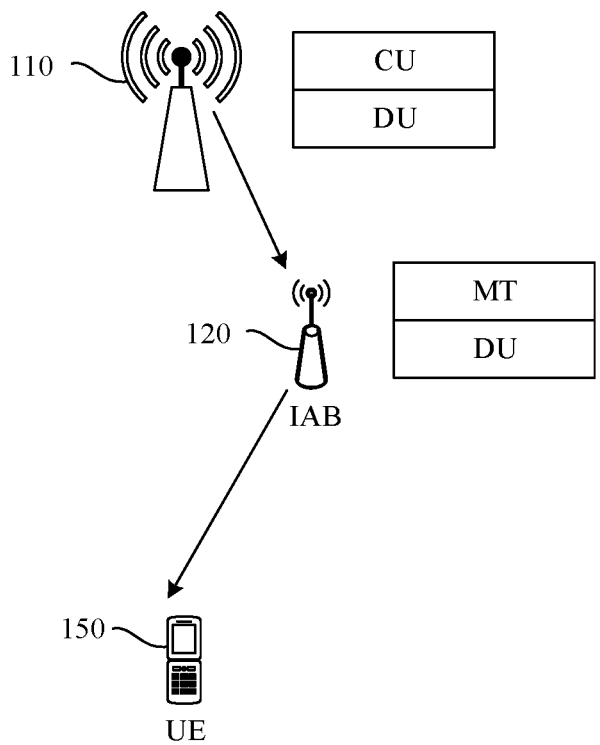
FIG. 2 is a schematic diagram of some network devices in an application scenario according to an embodiment of this application.

The relay station mentioned above may access an upper-level node or the donor node, and may also support access of the terminal. This is because the relay station includes both an access function/module and a backhaul function/module. FIG. 2 shows some network devices in the application scenario in FIG. 1. As shown in FIG. 2, an example in which the relay station 120 is an IAB device is used. The IAB device may include two function modules: a mobile-termination (mobile-termination, MT) function module and a distributed unit (distributed unit, DU) function module. The MT function module is configured to implement the backhaul function/module, and the DU function module is configured to implement the access function/module. An MT function is defined as a component similar to UE. In IAB, the MT function may be referred to as a function residing on the IAB node, and the IAB node may be connected to the upper-level node or an upper-level network through the MT function. The DU function is described relative to a centralized unit (centralized unit, CU) function. In 5G, functions of a base station are divided into two parts. This is CU-DU separation. From a perspective of a protocol stack, a CU function includes functions of a radio resource control (radio resource control, RRC) layer and a packet data convergence protocol (packet data convergence protocol, PDCP) layer of an original LTE base station, and a DU includes a radio link control (radio link control, RLC) layer, a media access control (media access control, MAC) layer, and a physical layer (physical layer, PHY). The CU and the DU may be physically connected by using an optical fiber, and may logically communicate with each other through a specially defined F1 interface. From a function perspective, the CU is mainly responsible for radio resource control and configuration, cross-cell mobility management, bearer management, and the like, and the DU is mainly responsible for scheduling, physical signal generation and sending, and the like.

In the IAB, in a time division duplex (time division duplexing, TDD) system, the access function and the backhaul function of the IAB device perform transmission in a time division multiplexing (time division multiplexing, TDM) manner. In other words, in a specific time unit, only the access function works or only the backhaul function works, and the two functions cannot work at the same time. When only the access function or only the backhaul function works, the access function or the backhaul function may use, in an allocated time resource, all system resources, including a frequency domain resource, a hardware resource, and the like.

When UE accesses the network (for example, the donor node or the IAB node) or the IAB device accesses the upper-level node or the donor node, a random access (random access) resource is to be used. The random access resource used by the UE may be obtained by reading a system message broadcast by the network such as a base station device, to obtain configuration information of a physical random access channel (physical random access channel, PRACH). The random access resource used by the IAB device may be obtained by reading a system message broadcast by the upper-level node of the IAB device or the donor node, a higher-layer signaling message sent by the upper-level node of the IAB device or the donor node, or the like, to obtain configuration information of a PRACH resource. The configuration information of the PRACH resource may indicate a time resource, a frequency domain resource, preamble (preamble) information, a quantity of retransmissions, a transmit power, and the like that can be used by the UE or the IAB device. For better understanding of the technical solutions in this application, the following provides detailed descriptions by using an example in which the configuration information of the PRACH resource is a physical random access channel configuration index (prach-configurationIndex).

In a 5G system, there are a total of 256 index values for the physical random access channel configuration index, and a value range is 0 to 255. A preamble format, time domain information of the PRACH resource, and the like may be determined by using the index value. The UE or the IAB node can obtain, by using the broadcast index, the configuration information that is of the PRACH resource and that corresponds to the index, namely, a random access resource configured by the donor node or the upper-level node for the UE or the IAB node. The following Table 1 shows a protocol table of some indexes and configuration information that is of PRACH resources and that corresponds to the indexes. The physical random access channel configuration indexes shown in the table are used as examples for description. It should be understood that Table 1 is merely an example, and does not constitute a limitation on this application.

TABLE 1

Physical random access channel configuration index and PRACH configuration information corresponding to the index

| First column PRACH configuration index | Second column Preamble format | Third column $n_{SFN}$ mod x = y | | Fourth column Slot number | Fifth column Mapping start symbol | Sixth column Quantity of PRACH slots with a subcarrier spacing of 60 kHz | Seventh column Quantity $N_t^{RA,slot}$ of PRACH occasions in one PRACH slot | Eighth column PRACH duration $N_{dur}^{RA}$ |
|---|---|---|---|---|---|---|---|---|
| | | x | y | | | | | |
| 0 | A1 | 16 | 1 | 4, 9, 14, 19, 24, 29, 34, and 39 | 0 | 2 | 6 | 2 |
| 1 | A1 | 16 | 1 | 3, 7, 11, 15, 19, 23, 27, 31, 35, and 39 | 0 | 1 | 6 | 2 |
| 2 | A1 | 8 | 1 or 2 | 9, 19, 29, and 39 | 0 | 2 | 6 | 2 |
| 3 | A1 | 8 | 1 | 4, 9, 14, 19, 24, 29, 34, and 39 | 0 | 2 | 6 | 2 |

As shown in Table 1, a parameter in the first column is the PRACH configuration index, a value range of an index value is 0 to 255, and each index value corresponds to one PRACH configuration. After obtaining the PRACH configuration index, the UE or the IAB node may obtain, based on a correspondence between an index value and a PRACH configuration, a time domain location of a random access resource configured by the donor node or the upper-level node for the UE or the IAB node.

It should be understood that, in the table, only the first four indexes and PRACH configurations corresponding to the first four indexes are used as examples for description. With development of communications technologies, the PRACH configuration index may have more than or fewer than 256 index values, and PRACH configurations corresponding to the index values may also be updated or changed. The four indexes are merely used as examples for description in the embodiments of this application.

A parameter in the second column is the preamble format. The preamble format is related to a cell coverage radius. Different preamble formats may be selected in different deployment scenarios, for example, when cell coverage radii are different, or when notifying the UE is supported in a scenario and not supported in another scenario. A preamble (preamble) is one piece of content actually sent by the UE or the IAB node on a physical random access channel, includes a cyclic prefix (cyclic prefix, CP) and a sequence (sequence), and is used to identify a user identity during random access. The CP, a sequence length, a quantity of repetition times of the sequence, and a length of a guard interval vary with the preamble format.

A parameter in the third column is $n_{SFN}$modx=y, and indicates specific system frames in which a PRACH resource is configured in time domain. $n_{SFN}$ indicates a system frame number, mod indicates a modulo operation, and y indicates a remainder.

In an example in which the index is 0 in the table, in a case of x=16 and y=1, when a remainder of a current system frame number $n_{SFN}$/(x=16) is (y=1), a PRACH resource is configured in a system frame corresponding to the system frame number. Therefore, it may be understood that, when the system frame number is 1, 17, 33, . . . , or (16*a+1) (where a is an integer greater than or equal to 0), a PRACH resource is configured in a system frame corresponding to the system frame number.

For another example, in a case of x=8 and y=2, when a remainder of a current system frame number $n_{SFN}$/(x=8) is (y=2), a PRACH resource is configured in a system frame corresponding to the current system frame number. Therefore, it may be understood that when the system frame number is 2, 10, 18, 26, . . . , or (8*b+2) (where b is an integer greater than or equal to 0), a PRACH resource is configured in a system frame corresponding to the system frame number.

In the embodiments of this application, one system frame is 10 ms. In the case of x=16 and y=1, it may be understood that there is an interval of 16 system frames between every two PRACH resources, that is, a periodicity of the PRACH resources is 160 ms. In the case of x=8 and y=2, it may be understood that there is an interval of eight system frames between every two PRACH resources, that is, a periodicity of the PRACH resources is 80 ms. It should be understood that the foregoing descriptions of system frames in which PRACH resources are configured are merely examples. It should be further understood that, in the embodiments of this application, an increase in the system frame number may indicate a backward shift of an absolute time. For example, when the frame number is increased by 1, it indicates that the absolute time is shifted backward by one system frame, that is, shifted backward by 10 ms.

It should be understood that the foregoing is merely an example, and does not constitute a limitation on this application.

A parameter in the fourth column in the table is the slot number, and further indicates slots that are in the system frame having the PRACH resource and in which the PRACH resource is configured. A time-frequency resource in an LTE system may be divided into a plurality of radio frames of 10 ms in time domain. One radio frame includes 10 subframes of 1 ms, one subframe includes two slots (slot), and each slot includes seven symbols (symbol) or six symbols.

For 5G, a new air interface access technology is defined, and a plurality of types of subcarrier spacings (subcarrier spacing, SCS) are introduced. Different subcarrier spacings may correspond to different slot lengths and symbol lengths. For example, in a system with a subcarrier spacing of 60 kHz, one system frame may include a maximum of 40 slots, and a length of each slot is 0.25 ms.

In the embodiments of this application, the 40 slots are numbered from 0 to 39, and may be respectively denoted as a slot #0 (slot #0), a slot #1 (slot #1), . . . , and a slot #39 (slot #39). Slot numbers in Table 1 may be understood as indicating slots that are in one system frame of 10 ms and in which a PRACH resource is configured. For example, a PRACH resource is configured in the slot #39, and it indicates that the PRACH resource is configured in the last slot in a system frame in which the PRACH resource is configured.

In 5G, different subcarrier spacings correspond to different slot lengths. In a system with a subcarrier spacing of 120 kHz, one system frame includes 80 slots, and each slot is 0.125 ms. In the embodiments of this application, the slots are numbered as a slot 0 to a slot 79. When the slot #39 in which the PRACH resource is configured and that is indicated based on the subcarrier spacing of 60 kHz is mapped to the system with the subcarrier spacing of 120 kHz, the PRACH resource is configured in the last two slots, namely, slots 78 and 79, in the system frame of 10 ms. Therefore, it may be understood that different subcarrier spacings correspond to different slot lengths, and a time domain location indicated by a slot number is determined based on a subcarrier spacing corresponding to the slot number.

A parameter in the fifth column in Table 1 is the mapping start symbol, and the parameter further indicates a symbol that is in the slot in which the PRACH resource is configured and in which the PRACH resource starts to be mapped. One slot corresponding to any subcarrier spacing includes 14 symbols. In the embodiments of this application, the 14 symbols in the slot are sequentially numbered as a symbol #0 to a symbol #13, and the symbol #0 is the first symbol in the slot. The index value 0 in Table 1 is used as an example. The parameter in the fifth column is 0, and it indicates that the PRACH resource starts to be mapped in the symbol numbered 0 (namely, the symbol #0 or the first symbol) in one slot.

In a case of the subcarrier spacing of 120 kHz, as shown in Table 1, when a parameter in the sixth column is 1, it indicates that the PRACH resource is configured in the second half of 0.25 ms, that is, the second 0.125 ms; and when a parameter in the sixth column is 2, it indicates that the PRACH resource is configured in both two 0.125 ms. This parameter is invalid when the subcarrier spacing is 60 kHz.

A parameter in the seventh column in the table is a quantity of PRACH occasions in one PRACH slot, and indicates a quantity of PRACH occasions (occasion) in one slot in time domain.

A parameter in the eighth column is PRACH resource duration, indicates a length of the PRACH occasion, and is expressed as a quantity of symbols. The index value 0 in the table is used as an example. When the PRACH resource duration is 2, it indicates that the length of one PRACH occasion is two orthogonal frequency division multiplexing (orthogonal frequency division multiplexing, OFDM) symbols. Different PRACH occasions may have different lengths. In other words, different PRACH occasions may include different quantities of OFDM symbols.

Based on the above, when the subcarrier spacing of 60 kHz is used as an example, and when the index is 0, with reference to the following information in Table 1: the parameter in the third column indicating that the system frame number is 1 plus a multiple of 16, the parameter in the fourth column indicating the numbers of the slots in which the PRACH resource is configured, the parameter in the fifth column indicating the mapping start symbol of the PRACH resource, and the parameter in the seventh column indicating that one slot includes six PRACH occasions, it can be learned that, when the PRACH configuration index is 0, PRACH resources are configured in the slots #4, #9, #14, #19, #24, #29, #34, and #39 in the system frames whose system frame numbers are 1, 17, 33, . . . , and the like.

Figure 3:
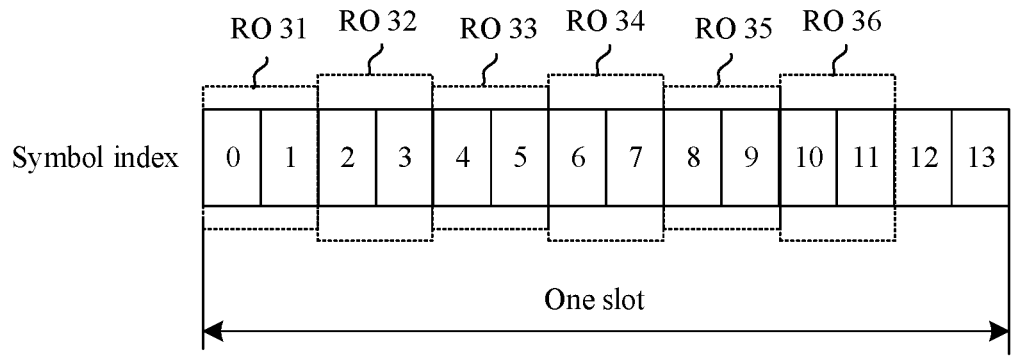
FIG. 3 is a schematic diagram of communication resources according to an embodiment of this application.

Specifically, in each of the foregoing slots, symbol locations of the PRACH resource are shown in FIG. 3. In each of the foregoing slots, there are a total of six PRACH occasions, which are also referred to as random access channel (random access channel, RACH) occasions and may also be represented as RACH occasions (RACH occasion, RO), including an occasion 1 (an RO 31) to an occasion 6 (an RO 36). A length of each PRACH occasion is two symbols. Therefore, the PRACH resource is configured in a symbol #0 to a symbol #11. The occasion RO 31 includes the symbol #0 and a symbol #1, the occasion RO 32 includes a symbol #2 and a symbol #3, and it can be deduced by analogy that the occasion RO 36 includes a symbol #10 and the symbol #11.

It can be further learned from Table 1 that time domain locations of PRACH resources corresponding to different random access channel configuration indexes may be the same or partially overlap.

For example, in PRACH resource configurations corresponding to the random access channel configuration indexes 0 and 1, from a perspective of a system frame, a PRACH resource is configured in each system frame in the two configurations. Further, from a perspective of slots, the PRACH resources are configured in slots #19 and slots #39 in the two configurations. Still further, in the slots #19 and the slots #39 in which the PRACH resources are configured in the two configurations, start symbols of the PRACH resources, quantities of PRACH occasions, and PRACH duration are the same. That is, in the two configurations, the PRACH resources in the slots #19 and the slots #39 are completely the same.

Because an IAB node needs to access an upper-level node, and also needs to receive a random access preamble sent by a terminal served by the IAB node or a lower-level IAB node, PRACH resources of the IAB node on two links may overlap in time domain. This may also be referred to as that the PRACH resources on the two links collide in time domain, in other words, the PRACH resources on the two links overlap or have any intersection in time domain. The two links herein may refer to an access link and a backhaul link, or may refer to two backhaul links. The two backhaul links include a backhaul link between the IAB node and the upper-level node and a backhaul link between the IAB node and the lower-level node.

In an IAB network, a sum of available resources is fixed for the access link and backhaul link. A random access resource is used as an example. When UE is to access the network, the IAB node, serving as a network device, needs to provide an access service for the UE, to be specific, needs to configure a PRACH resource for the UE, and also needs to receive a random access request sent by the UE. When the IAB node needs to access a donor node or the upper-level node, the donor node or the upper-level node needs to configure a PRACH resource for the IAB node.

Because the IAB node is constrained by half-duplex, if the PRACH resource configured by the IAB node for the UE and the PRACH resource configured by the upper-level node for the IAB node are the same or partially overlap in time domain, the IAB node cannot send a random access request to the upper-level node or the donor node while receiving the random access request from the UE.

In a possible implementation, it may be defined in a protocol that, when the PRACH resource configuration of the IAB node on the backhaul link collides with a PRACH resource configuration on the access link, the PRACH configuration on the access link takes priority. In other words, a RACH preamble is not transmitted on the collision PRACH resource on the backhaul link. This method can simplify the protocol and avoid the collision only by giving priority to the PRACH resource on the access link. In addition, because a random access process does not occur frequently on the backhaul link, impact on a system is relatively small. It should be understood that this solution cannot be used when the PRACH resource configurations on the access link and the backhaul link are completely the same.

In the foregoing solution of giving priority to the PRACH resource on the access link, when the backhaul link of the IAB node is abnormal, and the IAB node requests to send a scheduling request, because a part of the PRACH resource on the backhaul link is invalid, the IAB node needs to wait for a relatively long time before accessing the network.

In a possible implementation, after the IAB node accesses the network, the network configures a dedicated PRACH resource for the IAB node. Because 256 different PRACH configurations are defined in a current standard, a method for configuring the dedicated PRACH resource limits flexibility of selecting a PRACH configuration by the network. In addition, the dedicated PRACH resource and the PRACH resource configured by the IAB node for the UE are likely to collide in time domain.

In another possible implementation, different parameters of the PRACH resource are explicitly configured for the IAB node, for example, a system frame number, a slot number, and a symbol location. Such an explicit configuration of each parameter causes excessively high overheads.

In still another possible implementation, a system frame number is explicitly configured for the IAB node to enable the foregoing two PRACH resources to be in different system frames, to achieve orthogonality between the PRACH resources across adjacent hops. However, this method is no longer valid when the PRACH resource exists in each system frame.

Therefore, a method needs to be provided to enable a time domain resource used by the IAB node to send the random access request not to overlap a time domain resource used by the IAB node to receive the random access request. An embodiment of this application provides a random access resource configuration method, to resolve the configuration problem of the random access resources of the IAB node on the access link and the backhaul link. The following describes this embodiment of this application in detail with reference to FIG. 4.

It should be noted that the access function and the backhaul function of the IAB node may further support spatial multiplexing or full-duplex communication. In this embodiment of this application, only a time division multiplexing transmission manner of the IAB node in a time division duplex system is used as an example for description.

Figure 4:
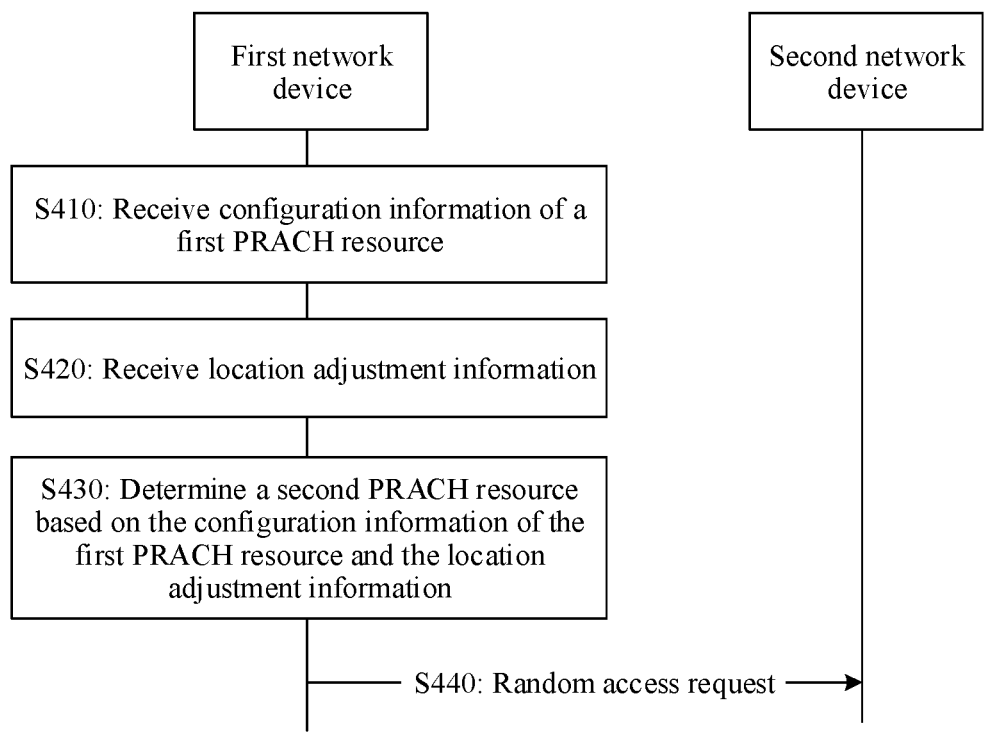
FIG. 4 is a schematic flowchart of a random access resource configuration method according to an embodiment of this application.

FIG. 4 is a schematic flowchart of a random access resource configuration method according to an embodiment of this application. The method in FIG. 4 may be performed by a first network device. The first network device may be, for example, the relay station 120 shown in FIG. 1 and FIG. 2, for example, an IAB device. The method includes step S410 to step S440.

In step S410, the first network device receives configuration information of a first PRACH resource.

The first network device may be the relay station 120 shown in FIG. 1 or FIG. 2. In this embodiment of this application, the first network device may be a device that performs half-duplex communication, or may be a device that performs full-duplex communication. For example, the first network device may be an IAB node.

The configuration information of the first PRACH resource indicates an initial PRACH resource configured by a network for the first network device during initial access of the first network device. The configuration information of the first PRACH resource may be received by the first network device from a second network device, or from another network device. The second network device may be the donor node 110 shown in FIG. 1 or FIG. 2, or may be an upper-level node of the first network device, for example, an upper-level IAB node. For example, if the second network device is the upper-level IAB node, the configuration information of the first PRACH resource may be sent by the upper-level IAB node to the first network device, or may be sent by another network device such as a donor node. If the second network device is the donor node, the configuration information of the first PRACH resource may be sent by the donor node to the first network device, or may be sent by another network device such as an upper-level IAB node.

The configuration information of the first PRACH resource may be configured through a broadcast system message, may be configured through an RRC configuration message, or may be configured through a new signaling message, for example, newly added resource indication signaling or resource configuration signaling.

In a possible implementation, the configuration information of the first PRACH resource may be initially configured through a system message. When the configuration information of the first PRACH resource changes, the configuration information of the first PRACH resource is configured through an RRC configuration message.

The configuration information of the first PRACH resource may be a PRACH configuration index, or may be other information that can indicate a configuration of the first PRACH resource.

In step S420, the first network device receives location adjustment information.

The location adjustment information is used to indicate to adjust a location of at least a part of the first PRACH resource in slots or symbols, to determine a second PRACH resource. The second PRACH resource is used by the first network device to send a random access request to the second network device. The first PRACH resource and a third PRACH resource that is configured by the first network device for UE or a child node of the first network device overlap in time domain. The third PRACH resource and the second PRACH resource that is obtained after the first PRACH resource is adjusted based on the location adjustment information do not overlap in time domain.

It should be understood that overlapping in time domain includes: The first PRACH resource and the third PRACH resource occupy some same slots or some same symbols in some slots, or occupy same time corresponding to some symbols in some slots. If different waveform parameters are used for an access link and a backhaul link of the IAB node, symbol locations on the access link and the backhaul link may not be completely the same. However, in one system frame, the PRACH resources on the access link and the backhaul link occupy the same time. The same time means occupying a same time domain location in the system frame. The waveform parameter includes at least one of a subcarrier spacing and a transmission time interval (transmission time interval, TTI).

The location adjustment information may be sent by the upper-level node of the first network device to the first network device, or may be sent by the donor node to the first network device.

The location adjustment information and the configuration information of the first PRACH resource may be simultaneously sent by a same network device such as the second network device to the first network device, or may be sent by different network devices to the first network device at different times. In other words, step S410 and step S420 may be performed at the same time, or may be performed at different times. In some embodiments, a sequence of step S410 and step S420 may be changed.

The second network device also needs to obtain the location adjustment information, where the location adjustment information is used to indicate to adjust the location of at least the part of the first physical random access channel PRACH resource in slots or symbols. The second network device may further determine the second PRACH resource by obtaining the location adjustment information. The second network device may receive, on the second PRACH resource, the random access request sent by the first network device.

There are a plurality of manners for determining the location adjustment information.

In a possible implementation, the location adjustment information may be determined by the donor node. For example, the donor node may obtain configuration information of PRACH resources on a plurality of access links and backhaul links in a cell served by the donor node, so that the donor node can obtain time-domain location information of the PRACH resources on the two links of the first network device, to determine the location adjustment information.

In another possible implementation, the location adjustment information may be determined by the upper-level node of the first network device, and the upper-level node of the first network device is another IAB node. For example, the upper-level node of the first network device may determine a time at which the first network device sends the random access request, based on a time at which the first network device receives a random access request, and therefore may determine the location adjustment information. Alternatively, the upper-level node of the first network device may further determine the location adjustment information based on time-domain location information of the PRACH resources on the two links of the first network device.

In still another possible implementation, the location adjustment information may alternatively be determined by a core network device, for example, an operation and management (operation and management) server. For example, an operator may configure the random access resources of the first network device and the location adjustment information through a remote server by using an algorithm or through manual configuration.

If the second network device is another IAB node, the second network device may alternatively receive the location adjustment information from the donor node, to adjust the PRACH resource of the first network device on the access link, so as to obtain the second PRACH resource, and receive, on the second PRACH resource, a random access request sent by the first network device.

In a possible implementation, the second network device may also receive a configuration that is sent by the donor node and that is of the PRACH resource, namely, the third PRACH resource, on the access link of the first network device, and the second network device determines a location adjustment offset by using the first PRACH resource and the third PRACH resource.

The location adjustment information may be used to indicate to adjust a location of the first PRACH resource in system frames, indicate to adjust a location of the first PRACH resource in slots, indicate to adjust a location of the first PRACH resource in symbols, or indicate a valid state or an invalid state of the first PRACH resource in slots or symbols. Alternatively, one or more of the foregoing indication manners are combined. It should be understood that "valid" herein indicates that the first network device can use a PRACH resource in a valid slot or symbol indicated by the location adjustment information, and "invalid" indicates that the first network device cannot use a PRACH resource in an invalid slot or symbol indicated by the location adjustment information, or no longer maps an RO to a corresponding location, or does not use a PRACH resource in a slot or symbol other than a valid slot or symbol indicated by the first network device.

In step S430, the first network device determines the second PRACH resource based on the configuration information of the first PRACH resource and the location adjustment information.

The second PRACH resource is obtained after adjusting the time domain location of the first PRACH resource.

The second PRACH resource is used by the first network device to send the random access request to the second network device.

The second PRACH resource and the third PRACH resource that is configured by the first network device for the UE or the child node of the first network device do not collide in time domain.

It should be understood that the first network device may determine time domain information of the first PRACH resource based on the configuration information of the first PRACH resource.

The first network device determines the second PRACH resource in a plurality of manners.

In a possible implementation, the location adjustment information may include a slot offset (slot offset), and the slot offset may be a positive offset or a negative offset. The positive offset indicates a backward offset, and the negative offset indicates a forward offset. Alternatively, the positive offset indicates a forward offset, and the negative offset indicates a backward offset. A specific meaning is not limited in this application.

The first network device may offset at least the part of the first PRACH resource based on the slot offset, to obtain the second PRACH resource.

For example, the first network device may determine, based on the configuration information of the first PRACH resource, information about a slot in which the first PRACH resource is configured, for example, a slot number. The first network device offsets at least the part of the first PRACH resource based on the slot offset indicated by the location adjustment information. In this case, the first network device may determine, as the second PRACH resource, a PRACH resource that is in the first PRACH resource and that has been offset in slots and a PRACH resource that is in the first PRACH resource and that is not offset in slots.

For example, if the location adjustment information is used to indicate to offset all resources in the first PRACH resource in slots, the first network device may determine, as the second PRACH resource, all the resources that are in the first PRACH resource and that have been offset to new slot locations based on the slot offset.

For another example, if the location adjustment information is used to indicate to offset a part of the first PRACH resource in slots, the first network device may determine, as the second PRACH resource, the part of the first PRACH resource that has been offset to a new slot location based on the slot offset and a remaining part of the first PRACH resource that is not offset.

For example, the location adjustment information may further include location information of a target slot, and the first network device may offset a PRACH resource in the target slot to obtain the second PRACH resource. The target slot may be at least a part of, any of, or all of slots in which the first PRACH resource collides with the third PRACH resource.

For example, if the target slot is a slot in which the first PRACH resource collides with the third PRACH resource, the location adjustment information is used to indicate to offset a PRACH resource that is in the first PRACH resource and that collides with the third PRACH resource in the target slot, and the first network device may determine, as the second PRACH resource, the PRACH resource that is offset to a new slot location and a PRACH resource that is in the first PRACH resource and that does not collide with the third PRACH resource in a slot.

It should be noted that, in this embodiment of this application, resource overlapping and resource collision have the same meaning, and may be replaced with each other. A slot in which a resource collision occurs may be referred to as a collision slot, and a symbol in which a resource collision occurs may be referred to as a collision symbol.

The first network device may obtain, in a plurality of manners, the slot in which the first PRACH resource collides with the third PRACH resource.

In an example, after the upper-level node of the first network device or the donor node determines the collision slot, the collision slot may be notified to the first network device through the location adjustment information. In other words, the location adjustment information may include information about the slot in which the first PRACH resource collides with the third PRACH resource, for example, a number of the collision slot. The collision slot may also be understood as the foregoing target slot.

In another example, the first network device may determine, based on the configuration information of the first PRACH resource and configuration information of the third PRACH resource, the slot in which the first PRACH resource collides with the third PRACH resource. For example, the first network device may determine the corresponding configuration information by using a first PRACH configuration index and a third PRACH configuration index, and determine a same slot number of the first PRACH resource and the third PRACH resource, or determine that corresponding slot numbers of the first PRACH resource and the third PRACH resource correspond to a same time domain location, so as to determine a number of a slot, namely, the collision slot, in which both the first PRACH resource and the third PRACH resource are configured.

It should be understood that when different waveform parameters are used for PRACHs on the access link and the backhaul link, slot numbers are different, but locations of time domain resources that correspond to different slots and that are on the access link and the backhaul link may be the same, and a collision also exists. Therefore, the collision slot of the first PRACH resource may be determined based on a time domain correspondence between a slot of the access link and a slot of the backhaul link, so as to determine a slot of a PRACH resource that is on the backhaul link and that needs to be adjusted.

In another possible implementation, the location adjustment information may include information about an unavailable slot or system frame, for example, a slot number or a system frame number. In other words, the location adjustment information is used to indicate the unavailable slot or system frame of the first PRACH resource, and the first network device may determine, as the second PRACH resource, a first PRACH resource that is in a slot or system frame other than the unavailable slot or system frame in slots or system frames in which the first PRACH resource is configured.

In still another possible implementation, the location adjustment information may include a symbol offset (symbol offset).

The first network device may offset at least the part of the first PRACH resource based on the symbol offset, to obtain the second PRACH resource.

For example, the first network device may determine, based on the configuration information of the first PRACH resource, information about a slot and a symbol in which the first PRACH resource is configured, for example, a slot number, a PRACH occasion, a quantity of symbols in an RO, and a number of a mapping start symbol of a PRACH resource. The first network device offsets at least the part of the first PRACH resource based on the symbol offset indicated by the location adjustment information. In this case, the first network device may determine, as the second PRACH resource, a PRACH resource that is in the first PRACH resource and that has been offset in symbols and a PRACH resource that is in the first PRACH resource and that is not offset in symbols.

The symbol offset may indicate an offset of one symbol, or may indicate an offset of a start symbol index of an RO.

For example, if the location adjustment information is used to indicate to offset all resources in the first PRACH resource in symbols, the first network device may determine, as the second PRACH resource, all the resources that are in the first PRACH resource and that have been offset to new symbol locations based on the symbol offset.

For another example, if the location adjustment information is used to indicate to offset a part of the first PRACH resource in symbols, the first network device may determine, as the second PRACH resource, the part of the first PRACH resource that has been offset to a new symbol location based on the symbol offset and a remaining part of the first PRACH resource that is not offset.

For example, the location adjustment information may further include location information of a target symbol, and the first network device may offset a PRACH resource in the target symbol to obtain the second PRACH resource. The target symbol may be at least a part of, any of, or all of symbols in which the first PRACH resource collides with the third PRACH resource.

For example, if the target symbol is a symbol in which the first PRACH resource collides with the third PRACH resource, the location adjustment information is used to indicate to offset, in symbols, a PRACH resource that is in the first PRACH resource and that overlaps the third PRACH resource in a slot or in time domain. The first network device may determine, as the second PRACH resource, the PRACH resource offset to a new symbol location, and a PRACH resource that is in the first PRACH resource and that does not overlap the third PRACH resource in a symbol.

It should be understood that when different waveform parameters are used for PRACHs on the access link and the backhaul link, slot numbers are different, but locations of time domain resources that correspond to different slots and that are on the access link and the backhaul link may be the same, and a collision also exists. In this case, a resource that is in a symbol of the first PRACH resource and that collides with the third PRACH resource in time domain may be offset to avoid the collision.

For another example, the location adjustment information may include the offset of the start symbol index of the RO. The first network device may obtain a PRACH occasion of the first PRACH resource in time domain and a length (a quantity of symbols) of each PRACH occasion. Because the symbols in the PRACH occasion may be consecutive, when the location adjustment information is used to indicate the offset of the start symbol index of the PRACH occasion, the entire PRACH occasion may be offset, in other words, a PRACH resource in each symbol in the PRACH occasion is offset. Similarly, when the location adjustment information is used to indicate the offset of the start symbol index of the RO, the method is also applicable to offsetting the entire first PRACH resource or a part of the first PRACH resource in symbols. A manner in which the first network device determines the second PRACH resource is similar to the foregoing method. For brevity, details are not described herein again.

Optionally, after the first PRACH resource is offset based on the symbol offset, if the first PRACH resource is offset beyond a current slot or offset to a next slot, a PRACH resource moved beyond symbols in the current slot is no longer valid, and a PRACH resource that is still in a symbol in the current slot after the offset is still valid. In this way, impact that may be caused by offsetting the PRACH resource beyond the current slot on signal transmission in another slot can be avoided.

The first network device may obtain, in a plurality of manners, a collision symbol in the slot in which the first PRACH resource overlaps the third PRACH resource.

It should be understood that the overlap slot or the collision slot refers to a slot in which a collision resource in the first PRACH resource is located, and may have a number the same as or different from that of a slot in which a collision resource in the third PRACH resource is located.

When waveform parameters (for example, subcarrier spacings) of the access link and the backhaul link are inconsistent, slot numbers of the first PRACH resource and the third PRACH resource are different, and the overlap slot or the collision slot is a slot that corresponds to the first PRACH resource and that corresponds to a time domain location at which the first PRACH resource overlaps the third PRACH resource. The following overlap slot or collision slot has the same meaning, and details are not described again.

In an example, after the upper-level node of the first network device or the donor node determines the collision slot and/or the collision symbol, the collision slot and/or the collision symbol may be notified to the first network device through the location adjustment information. In other words, the location adjustment information may include information about the slot and/or the symbol in which the first PRACH resource collides with the third PRACH resource, for example, a number of the collision slot and/or a number of the collision symbol. The collision symbol may be understood as the foregoing target symbol.

In another example, the first network device may determine, based on the configuration information of the first PRACH resource and the configuration information of the third PRACH resource, the symbol in which the first PRACH resource collides with the third PRACH resource. For example, the first network device may determine the corresponding configuration information by using a first PRACH configuration index and a third PRACH configuration index, and determine numbers of symbols in which the first PRACH resource and the third PRACH resource are configured, so as to determine a number of a symbol, namely, the collision symbol, in which both the first PRACH resource and the third PRACH resource are configured.

In still another possible implementation, the location adjustment information may include a slot or symbol index. The slot or symbol index is used to indicate a slot or symbol in which a random access resource can or cannot be used by the first network device.

In still another possible implementation, the location adjustment information may include a system frame index and/or a periodicity, and the system frame index and/or the periodicity are/is used to indicate a system frame in which a random access resource can or cannot be used by the first network device. Alternatively, it may be understood as that the system frame index and/or the periodicity are/is used to indicate an interval at which the first network device can or cannot use a random access resource in a system frame. The periodicity may be understood as a time interval between two times of random access initiated by the first network device. In other words, the periodicity is used to indicate a time interval of using the second PRACH resource by the first network device. It should be understood that the first network device may normally receive the configuration information of the first PRACH resource, and the first network device may determine, based on the configuration information of the first PRACH resource, the first PRACH resource configured for the first network device for use. When the location adjustment information includes the periodicity, the first network device may further determine, based on the periodicity in the location adjustment information, system frames in which a random access resource can be used for the first PRACH resource and system frames in which a random access resource cannot be used for the first PRACH resource. In other words, the first network device determines, based on the periodicity in the location adjustment information, an interval at which a random access resource in a system frame can be used for the first PRACH resource.

For example, the location adjustment information may include an index of an available symbol, the index of the available symbol is used to indicate the symbol that can be used by the first network device, and the first network device may determine, as the second PRACH resource, a PRACH resource in the symbol corresponding to the index of the available symbol. In this case, the index of the available symbol is applicable to all slots in which the first PRACH resource exists. The index of the available symbol may be explicitly configured by the upper-level node or the donor node.

For example, the location adjustment information is used to indicate a number of a PRACH occasion or a number of a start symbol in a PRACH occasion, and the first network device may determine, as the second PRACH resource, a PRACH resource in the PRACH occasion or a symbol indicated by the location adjustment information.

For another example, the location adjustment information may include an index of an available symbol in the collision slot. In this case, the index of the available symbol is applicable to the collision slot. To be specific, the location adjustment information is used to indicate a symbol that is in the collision slot and in which a PRACH resource is available. A PRACH resource in each slot in which the first PRACH resource does not overlap the third PRACH resource is valid. Therefore, the first network device may determine, as the second PRACH resource, the PRACH resource in the available symbol in the collision slot and a PRACH resource in a slot other than the collision slot in slots in which the first PRACH resource is located.

Optionally, the location adjustment information may further include an index or a number of the collision slot, and the index or the number is used by the first network device to determine the collision slot. Alternatively, the first network device determines the collision slot based on the configuration information of the first PRACH resource and the configuration information of the third PRACH resource, and then determines, in the collision slot based on the location adjustment information, the available symbol of the first PRACH resource.

For another example, the location adjustment information may include an index of an unavailable symbol, and the index of the unavailable symbol is used to indicate a symbol that is in the collision slot and in which a PRACH resource cannot be used by the first network device. A PRACH resource in another symbol that is not indicated can be used. If the index of the unavailable symbol is applicable to all slots in which the first PRACH resource is configured, the first network device may determine, as the second PRACH resource, some or all symbols other than the unavailable symbol in symbols in the slots of the first PRACH resource. If the index of the unavailable symbol is applicable to a symbol that is in the collision slot and in which the first PRACH resource is configured, the first network device may determine, as the second PRACH resource, some or all symbols other than the unavailable symbol in the collision slot and a PRACH resource (symbol) in a slot in which no collision occurs.

A manner of determining the collision slot is similar to the foregoing method for determining the collision slot when the location adjustment information is the available symbol. For brevity, details are not described herein again.

For still another example, the location adjustment information may include an index of an available slot, and the index of the available slot is used to indicate a slot that can be used by the first network device. If the index of the available slot is applicable to all system frames in which the first PRACH resource is configured, the first network device may determine, as the second PRACH resource, a PRACH resource in slots corresponding to the index of the available slot. If the index of the available slot is applicable to a system frame in which the first PRACH resource overlaps/collides with the third PRACH resource, the first network device determines, as the second PRACH resource, a PRACH resource in the available slot in the system frame in which the first PRACH resource overlaps/collides with the third PRACH resource and the first PRACH resource in a system frame in which the first PRACH resource does not overlap/collide with the third PRACH resource. The index of the available slot may be explicitly configured by the upper-level node or the donor node.

In the foregoing possible implementations, the second PRACH resource determined by the first network device is a subset of the first PRACH resource.

The foregoing describes, from a perspective of the first network device, the method for determining the second PRACH resource. The second network device also needs to determine the location adjustment information and/or the second PRACH resource. The second network device obtains the location adjustment information, where the location adjustment information is used to indicate to adjust the location of at least the part of the first physical random access channel PRACH resource in slots or symbols; and the second network device sends the location adjustment information to the first network device.

In a possible implementation, the second network device may be a donor node. In this case, because the second network device has configuration information of third PRACH resources of all IAB nodes that are controlled by the second network device and that include the first network device, and the third PRACH resources include a resource used by the first network device to receive the random access request on the access link, the second network device may determine the location adjustment information based on a PRACH resource of an upper-level node of the first network device and the third PRACH resource of the first network device.

If the donor node is the upper-level node of the first network device, the second network device also needs to determine the second PRACH resource. A method is the same as that in the foregoing embodiment. Details are not described again. A method for determining the location adjustment information is the same as that described above. Details are not described again. In this case, the second network device may further receive, on the second PRACH resource, the random access request sent by the first network device.

In a possible implementation, the second network device may be another IAB node. In this case, if the location adjustment information obtained by the second network device is received from a donor node, a method for determining the second PRACH resource by the second network device is the same as that used by the first network device. Details are not described again. If the second network device determines the location adjustment information by using the third PRACH resource, the second network device may determine the second PRACH resource when determining the location adjustment information.

When the second network device is another IAB node, the second network device may further obtain the third PRACH resource of the first network device through mutual measurement between the nodes, and does not need to receive the third PRACH resource of the first network device from the donor node. In this case, after determining the location adjustment information, the second network device may further send the location adjustment information of the first network device to the donor node, and the donor node sends the location adjustment information to the first network device through an F1AP (F1 application protocol, F1AP) interface (F1 application protocol interface) or an F1AP enhanced interface. Alternatively, the second network device directly sends the location adjustment information to the first network device through MAC signaling (MAC control element, MAC CE) (media access control control element). Alternatively, the second network device may send the location adjustment information to the first network device through other signaling, for example, an RRC message or dedicated signaling. A specific manner is not limited in this application. In this application, the F1AP interface is used to represent the F1AP interface or the F1AP enhanced interface. Details are not described again.

In the foregoing implementation, the second network device is another IAB node. In this case, that the second network device sends the location adjustment information to the first network device includes: The second network device sends the location adjustment information to the first network device through the donor node, or directly sends the location adjustment information to the first network device. If the location adjustment information is generated by the second network device, the location adjustment information needs to be sent to the first network device through the donor node, or the location adjustment information may be directly sent to the first network device, for example, through the MAC CE.

If the location adjustment information is sent by the donor node to the second network device, the location adjustment information also needs to be sent to the first network device. In this case, the location adjustment information sent by the donor node may be forwarded by the second network device to the first network device, and that the second network device sends the location adjustment information to the first network device is forwarding the location adjustment information of the donor node. In another possible implementation, after receiving the location adjustment information sent by the donor node, the second network device sends the location adjustment information to the first network device through, for example, a MAC CE over an air interface.

It should be understood that the donor node may send the location adjustment information to the first network device through the RRC message, the F1AP interface, or the F1AP enhanced interface. In this case, the second network device only forwards the location adjustment information sent by the donor node to the first network device.

When the second network device is another IAB node, the second network device may further determine the second PRACH resource. A method for determining the second PRACH resource is the same as that described above. Details are not described again.

Further, the second network device may further perform S440: Receive, on the second PRACH resource, the random access request sent by the first network device. Details are described below, and are not described again.

Step S440: The first network device sends the random access request to the second network device on the second PRACH resource.

After step S430, the second PRACH resource and the third PRACH resource do not overlap in time domain locations. Therefore, when the first network device receives the random access request sent by the UE or the child node of the first network device, if the first network device also needs to send the random access request to the second network device, because the second PRACH resource and the third PRACH resource are staggered in time domain locations, the first network device may not need to send the random access request while receiving the random access request.

The first network device determines the second PRACH resource based on the configuration information of the first PRACH resource and the location adjustment information, and sends the random access request to the second network device on the second PRACH resource. If the second network device needs to successfully receive the random access request sent by the first network device, the second network device also needs to determine the second PRACH resource.

In a possible implementation, the second network device may determine the location adjustment information and/or the second PRACH resource based on the configuration information of the first PRACH resource and the configuration information of the third PRACH resource.

For example, if the second network device is the donor node, the donor node may determine time domain locations of the first PRACH resource and the third PRACH resource and a collision condition between the first PRACH resource and the third PRACH resource based on the known configuration information of the first PRACH resource and the known configuration information of the third PRACH resource, to determine the location adjustment information and the second PRACH resource. The donor node may send the location adjustment information to the first network device, so that the first network device determines the second PRACH resource. The donor node may directly receive, by using the determined second PRACH resource, the random access request sent by the first network device.

For another example, if the second network device is the upper-level node of the first network device, in other words, the second network device is another IAB node, the upper-level node may determine the second PRACH resource based on the received location adjustment information and the known configuration information of the first PRACH resource. The upper-level node may receive the location adjustment information from the donor node or the core network device. A method for determining the second PRACH resource by the second network device is similar to the method described in step S430. For brevity, details are not described herein again.

For another example, if the second network device is the upper-level node of the first network device, the upper-level node may determine the location adjustment information and/or the second PRACH resource based on the received configuration information of the third PRACH resource and the known configuration information of the first PRACH resource.

The upper-level node may receive the configuration information of the third PRACH resource in the following several non-limitative manners.

In a possible implementation, the second network device receives the configuration information of the third PRACH resource of the first network device. Specifically, the second network device may receive a configuration of a third PRACH resource of a lower-level node from the donor node, or the second network device receives a configuration that is of the third PRACH resource and that is sent by the first network device.

If the second network device may receive the configuration of the third PRACH resource of the lower-level node from the donor node, the second network device receives the RRC message of the donor node through an MT function of the second network device, where the RRC message includes the configuration of the third PRACH resource. It should be understood that, in this case, the second network device is another IAB node. If the second network device has a plurality of lower-level nodes, the RRC message should include configurations of third PRACH resources of the plurality of lower-level nodes. The second network device determines the collision slot and the location adjustment information based on the configuration of the third PRACH resource. A specific method is similar to the method in the foregoing embodiment. Details are not described again.

If the second network device receives the configuration that is of the third PRACH resource and that is sent by the first network device, the configuration of the third PRACH resource may be notified through a MAC CE. A specific message format of the MAC CE is not limited in this application.

In still another possible implementation, the second PRACH resource may be directly notified to the second network device after being determined by an upper-level node of the second network device or the donor node. That is, the second network device directly receives the second PRACH resource.

According to the foregoing embodiment, the first network device can adjust the configured first PRACH resource in slots or symbols, and perform random access by using the second PRACH resource obtained after the adjustment. This can avoid a case in which the random access resource on the backhaul link or the access link is unavailable because of a collision between the PRACH resources of the IAB node on the access link and the backhaul link. The time domain location of the access resource on the backhaul link is adjusted, to maintain that the access resource on the backhaul link is available. This resolves the configuration problem that occurs when the random access resources of the IAB node collide on the access link and the backhaul link, and avoids an excessively long waiting time when the IAB node needs to perform random access.

It should be noted that, because the IAB node supports access of the terminal, and also supports access of the lower-level node of the IAB node, when a PRACH resource on a backhaul link between the IAB node and the lower-level node collides with the PRACH resource on the backhaul link between the IAB node and the upper-level node, the solutions in the foregoing embodiment are also applicable. In other words, whether the PRACH resources of the IAB node collide on the access link and the backhaul link or the PRACH resources of the IAB node collide on the two backhaul links is not limited in this embodiment of this application.

The following describes some specific but non-limitative examples of this embodiment of this application in more detail with reference to FIG. 5 to FIG. 8.

It should be understood that the method in this embodiment of this application may be used in a scenario in which two PRACH resource configurations overlap or collide in some system frames, or may be used in a scenario in which two PRACH resource configurations overlap in each system frame. For example, in a case of x=1 and y=0 in the PRACH configuration index table, according to the resource mapping rule, the PRACH resource exists in each system frame. When a configuration index in the case of x=1 and y=0 is used for one of the two links that require time division multiplexing, regardless of values of x and y that are set for the other link, time division multiplexing cannot be implemented on all slots in which the PRACH resources are configured, that is, the PRACH resources used on the two links definitely overlap. For better understanding of the technical solutions in this application, in the embodiments of this application, the case in which the PRACH resources used on the two links overlap in each system frame is used as an example for description. However, as described above, the method in this embodiment of this application may also be used in the scenario in which the PRACH resources on the two links overlap only in some system frames.

Figure 5:
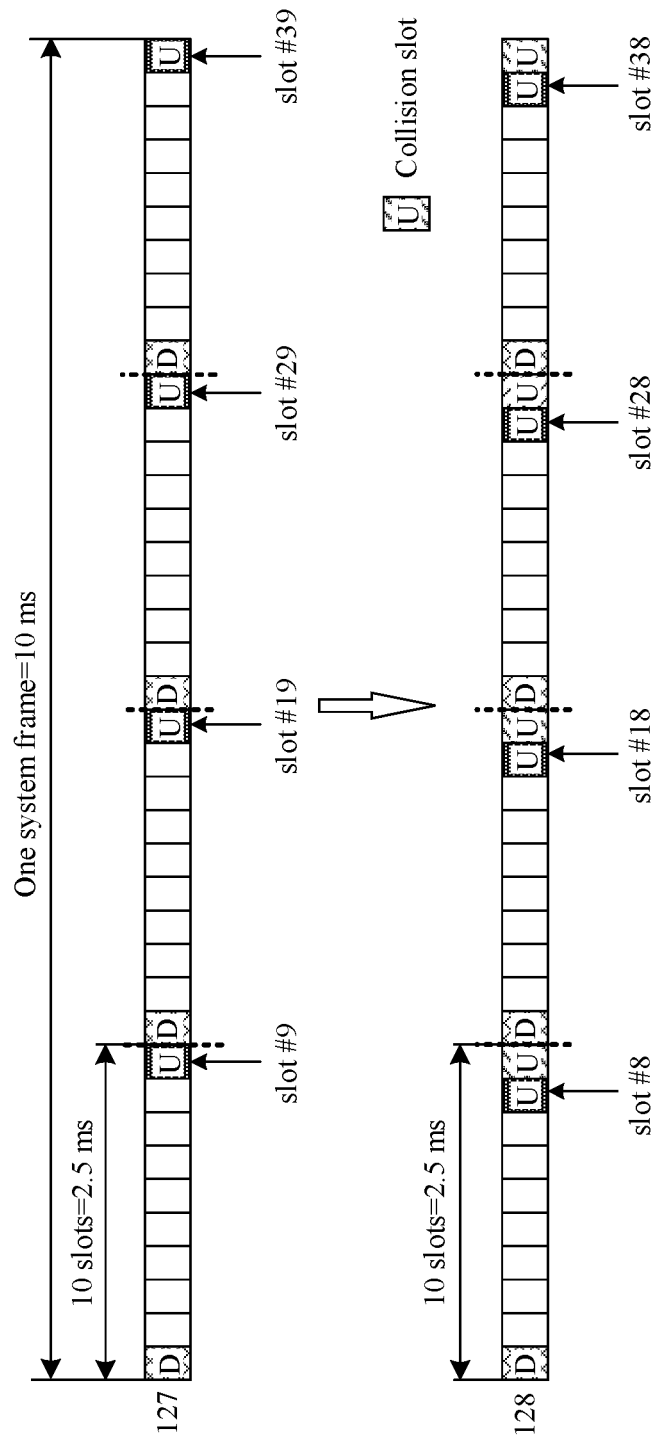
FIG. 5 is a schematic diagram of communication resources according to an embodiment of this application.

FIG. 5 is a schematic diagram of communication resources according to an embodiment of this application. In the figure, it is assumed that a same waveform parameter, for example, a subcarrier spacing, is used for an access link and a backhaul link. PRACH configuration indexes and other configuration information corresponding to the communication resources are shown in Table 2. In this embodiment, location adjustment information includes a slot offset.

It should be noted that, in this embodiment of this application, both slots and symbols are numbered from #0. To be specific, a slot 0 (#0) corresponds to the first slot, and a symbol 0 (#0) corresponds to the first symbol. By analogy, when a quantity of the slots or symbols is increased by 1, a slot or symbol number is increased by 1 based on a previous slot or symbol number. In this embodiment of this application, for ease of understanding, an example in which the subcarrier spacing is 60 kHz is used. One system frame of 10 ms includes 40 slots numbered from the slot #0 to a slot #39, and one slot of 0.25 ms includes 14 symbols numbered from the symbol #0 to a symbol #13. This example is also applicable to the following embodiments. For brevity, details are not described again in the following embodiments.

As shown in Table 2, PRACH configuration indexes 127 and 128 and corresponding PRACH configuration information are listed as examples. For ease of description, in this embodiment of this application, it is assumed that a PRACH configuration index broadcast by a first network device to UE is 127, and a PRACH configuration index that is sent by an upper-level node or a donor node and that is received by the first network device is 128. In other words, the PRACH configuration index 128 corresponds to configuration information of a first PRACH resource, and the PRACH configuration index 127 corresponds to configuration information of a third PRACH resource. The first PRACH resource is an initial PRACH resource configured by a second network device for the first network device, and the third PRACH resource is a PRACH resource configured by the first network device for the UE or a child node of the first network device. The first network device may receive, on the third PRACH resource, a random access request sent by the UE or the child node of the first network device. For ease of description, in this embodiment of this application, an example in which the first network device is an IAB node is used for description, and the second network device may be the upper-level node of the IAB node or the donor node.

TABLE 2

PRACH configuration indexes (127 and 128) and corresponding PRACH configuration information

| First column PRACH configuration index | Second column Preamble format | Third column $n_{SFN} \bmod x = y$ | | Fourth column Slot number | Fifth column Mapping start symbol | Sixth column Quantity of PRACH slots with a subcarrier spacing of 60 kHz | Seventh column Quantity $N_t^{RA,slot}$ of PRACH occasions in one PRACH slot | Eighth column PRACH duration $N_{dur}^{RA}$ |
|---|---|---|---|---|---|---|---|---|
| | | x | y | | | | | |
| 127 | B4 | 1 | 0 | 9, 19, 29, and 39 | 2 | 2 | 1 | 12 |
| 128 | B4 | 1 | 0 | 9, 19, 29, and 39 | 0 | 2 | 1 | 12 |

For example, a specific procedure in this embodiment is as follows.

Step 1: The IAB node may receive a system message broadcast by the upper-level node or receive an RRC configuration sent by the upper-level node or the donor node, to obtain a configuration of the first PRACH resource. Specifically, an MT function of the IAB node receives the foregoing configuration.

Step 2: The IAB node receives the slot offset sent by the upper-level node or the donor node.

In this embodiment of this application, it is assumed that the slot offset is −1. Specifically, when the second network device is the upper-level node of the IAB node, the slot offset may be sent by the upper-level node, or may be sent by the donor node. When the second network device is the donor node, in other words, the upper-level node of the IAB node is the donor node, the slot offset is sent by the donor node. The slot offset may be determined by the donor node, and then notified by the donor node to the upper-level node of the IAB node or the IAB node.

Step 3: The IAB node determines, based on the received configuration information of the first PRACH resource, a number that is of a slot in which a PRACH resource is configured and that is indicated by the configuration information of the first PRACH resource.

The IAB node determines, based on the slot offset received in step 2, a time domain location of a PRACH resource (namely, the second PRACH resource) actually configured by the upper-level node or the donor node.

Optionally, the IAB node may offset all resources in the first PRACH resource. In this case, in this step, the IAB node may not need to obtain a slot in which the third PRACH resource is located. However, for better understanding of the technical solutions in this embodiment of this application, Table 2 and FIG. 5 each show slot locations of the third PRACH resource. However, it should be understood that determining the slot locations of the third PRACH resource is an optional step in this embodiment.

It can be learned from information in the third column in Table 2 that, in the foregoing two PRACH resource configurations, x=1, y=0, and the PRACH resources overlap in each system frame. Further, it can be learned from a parameter in the fourth column that, the two PRACH resources (namely, the first PRACH resource and the third PRACH resource) overlap in slots #9, #19, #29, and #39. In one system frame, slot locations of the first PRACH resource and the third PRACH resource are shown in FIG. 5.

In FIG. 5, the first row shows the slot locations of the third PRACH resource corresponding to the PRACH configuration index 127 in one system frame, where the third PRACH resource is configured in the slot #9, the slot #19, the slot #29, and the slot #39 (which are at slot locations filled with dots in the first row in the figure); and the second row shows the slot locations of the first PRACH resource corresponding to the PRACH configuration index 128 in one system frame, where the first PRACH resource is configured in the slot #9, the slot #19, the slot #29, and the slot #39 (which are at slot locations filled with slashes in the second row in the figure).

The slots that are shown in the second row and in which the first PRACH resource is configured are offset based on the slot offset −1. The slot offset −1 indicates moving the slots in which the first PRACH resource is located forward by one slot. To be specific, in the second row in FIG. 5, the first PRACH resource in the slot #9, the slot #19, the slot #29, and the slot #39 is offset to a slot #8, a slot #18, a slot #28, and a slot #38 (which are at slot locations filled with dots in the second row of FIG. 2). In other words, the PRACH resource in the slot #8, the slot #18, the slot #28, and the slot #38 is the second PRACH resource determined by the IAB node, namely, the PRACH resource actually configured by the upper-level node for the IAB node. It should be understood that, that the offset −1 herein indicates moving forward by one slot is merely an example.

Therefore, with reference to the configuration information of the first PRACH resource and the slot offset, in a parameter in the fourth column in Table 2, numbers of the slots that are configured by the upper-level node for the IAB node and in which the PRACH resource exists are actually 8, 18, 28, and 38.

It should be understood that the slot offset −1 provided in this embodiment of this application is merely an example, and the slot offset may alternatively be another integer value. For example, the slot offset is −2.

Optionally, if the upper-level node or the donor node indicates the system frame offset mentioned above, the slot offset in this embodiment of this application may coexist with the indication of the system frame offset. The IAB node may alternatively determine a location of the second PRACH resource based on indications of both the system frame offset and the slot offset. For example, the system frame in which the first PRACH resource is configured may be first offset based on the indication of the system frame offset, and then the slots in which the first PRACH resource is configured are offset in the offset system frame based on the slot offset. Alternatively, the slots are first offset, and then the system frame is offset. This is not limited in this embodiment of this application.

Optionally, if the second network device that sends the slot offset is the upper-level node of the IAB node, before determining the PRACH resource (namely, the second PRACH resource) on the link between the upper-level node and the IAB node, the upper-level node may receive the indication of the slot offset sent by the donor node or a core network device, or receive the configuration of the PRACH resource of the access link of the lower-level IAB node. A method for determining, by the upper-level node, a location of the resource (namely, the second PRACH resource) for receiving the random access request sent by the IAB node may be the same as the method for determining the second PRACH resource by the IAB node.

In the embodiment shown in FIG. 5, the first PRACH resource and the third PRACH resource completely overlap in time domain. Therefore, the IAB node may offset, based on the slot offset, all the slots in which the first PRACH resource is configured. In some other embodiments, if the first PRACH resource and the third PRACH resource partially overlap in slots, the IAB node may offset, based on the slot offset, all slots in which the first PRACH resource is configured, and a method is similar to the method in the embodiment shown in FIG. 5. Alternatively, the IAB node may offset only the slot in which a collision exists. The following uses a case in Table 3 and FIG. 6 as an example for description.

Figure 6:
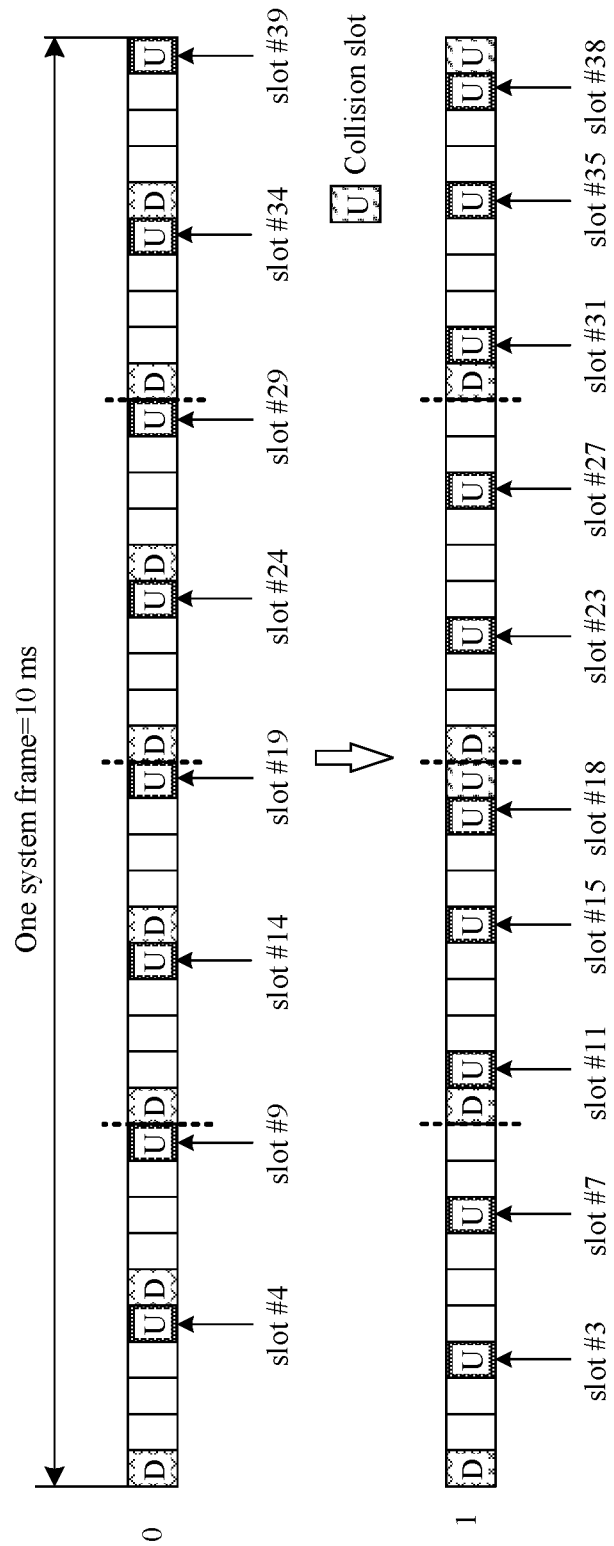
FIG. 6 is a schematic diagram of communication resources according to an embodiment of this application.

FIG. 6 is a schematic diagram of communication resources according to another embodiment of this application. PRACH configuration indexes and other configuration information corresponding to the communication resources are shown in Table 3. In this embodiment, location adjustment information includes a slot offset, and the slot offset is valid only for a slot in which a first PRACH resource collides with a third PRACH resource. In this embodiment, it is still assumed that the slot offset is −1.

TABLE 3

PRACH configuration indexes (0 and 1) and corresponding PRACH configuration information

| First column PRACH configuration index | Second column Preamble format | Third column $n_{SFN}$ mod x = y | | Fourth column Slot number | Fifth column Mapping start symbol | Sixth column Quantity of PRACH slots with a subcarrier spacing of 60 kHz | Seventh column Quantity $N_t^{RA,slot}$ of PRACH occasions in one PRACH slot | Eighth column PRACH duration $N_{dur}^{RA}$ |
|---|---|---|---|---|---|---|---|---|
| | | x | y | | | | | |
| 0 | A1 | 16 | 1 | 4, 9, 14, 19, 24, 29, 34, and 39 | 0 | 2 | 6 | 2 |
| 1 | A1 | 16 | 1 | 3, 7, 11, 15, 19, 23, 27, 31, 35, and 39 | 0 | 1 | 6 | 2 |

As shown in Table 3, the PRACH configuration indexes 0 and 1 and the corresponding PRACH configuration information are listed as examples. For ease of description, in this embodiment of this application, it is assumed that a PRACH configuration index broadcast by a first network device to UE is 0, and a PRACH configuration index that is sent by an upper-level node or a donor node and that is received by the first network device is 1. In other words, the PRACH configuration index 1 corresponds to configuration information of a first PRACH resource, and the PRACH configuration index 0 corresponds to configuration information of a third PRACH resource. The first PRACH resource is an initial PRACH resource configured by a second network device for the first network device, and the third PRACH resource is a PRACH resource configured by the first network device for the UE or a child node of the first network device. The first network device may receive, on the third PRACH resource, a random access request sent by the UE or the child node of the first network device. For ease of description, in this embodiment of this application, an example in which the first network device is an IAB node is used for description, and the second network device may be the upper-level node of the IAB node or the donor node.

For example, in a specific procedure in this embodiment, step 1 to step 3 are similar to step 1 to step 3 in the embodiment shown in FIG. 5, and a difference lies in that in step 3 in the embodiment shown in FIG. 6, when the IAB node determines a time domain location of a second PRACH resource, only a slot in which a collision exists is offset. The following provides detailed descriptions with reference to Table 3 and FIG. 6.

In this embodiment of this application, because the slot offset is valid only for the slot in which the first PRACH resource collides with the third PRACH resource, the IAB node needs to obtain the collision slot.

Optionally, the IAB node may receive information that is about the collision slot and that is sent by the upper-level node or the donor node, for example, a collision slot number index. The information about the collision slot and the slot offset may be together sent to the IAB node, or may be separately sent to the IAB node.

Optionally, the IAB node may determine the information about the collision slot. For example, the IAB node may determine the configuration information of the third PRACH resource based on the configuration index that is of the third PRACH resource and that is broadcast by the IAB node, in other words, determine slot locations of the third PRACH resource. The IAB node may determine, based on the configuration information that is of the first PRACH resource and that is sent by the upper-level node, slot locations at which the first PRACH resource is configured. Therefore, the slot in which the first PRACH resource collides with the third PRACH resource can be determined. For better understanding of the technical solutions in this embodiment of this application, an example in which the IAB node determines the collision slot is used in this embodiment of this application to describe the technical solutions in this embodiment of this application.

Table 3 and FIG. 6 each show the slot locations of the third PRACH resource. It can be learned from a parameter in the fourth column in Table 3 that the two PRACH resources (namely, the first PRACH resource and the third PRACH resource) collide (or overlap) in slots #19 and #39. In one system frame, slot locations of the first PRACH resource and the third PRACH resource are shown in FIG. 6.

In FIG. 6, the first row shows the slot locations of the third PRACH resource corresponding to the PRACH configuration index 0 in one system frame, where the third PRACH resource is configured in a slot #4, a slot #9, a slot #14, the slot #19, a slot #24, a slot #29, a slot #34, and the slot #39 (which are at slot locations filled with dots in the first row in FIG. 6); and the second row shows the slot locations of the first PRACH resource corresponding to the PRACH configuration index 1 in one system frame, where the first PRACH resource is configured in a slot #3, a slot #7, a slot #11, a slot #15, a slot #23, a slot #27, a slot #31, a slot #35 (which are at slot locations filled with dots in the second row in FIG. 6), and in the slot #19 and the slot #39 (which are at slot locations filled with slashes in the second row in FIG. 6). The first PRACH resource and the third PRACH resource collide in the slot #19 and the slot #39.

The slots that are shown in the second row and in which the first PRACH resource is configured are offset based on the slot offset −1. The slot offset −1 indicates moving the slots in which the first PRACH resource is located forward by one slot. To be specific, in the second row in FIG. 6, the first PRACH resource in the slot #19 and the slot #39 is offset to a slot #18 and a slot #38 (which are at slot locations filled with dots in the second row of FIG. 2). The second PRACH resource includes a resource that is in the first PRACH resource and that has been offset and a resource that is in the first PRACH resource and that is not offset. In other words, the PRACH resource in the slot #3, the slot #7, the slot #11, the slot #15, the slot #18, the slot #23, the slot #27, the slot #31, the slot #35, and the slot #38 (which are at all slot locations filled with dots in the second row in FIG. 6) is the second PRACH resource determined by the IAB node, namely, the PRACH resource actually configured by the upper-level node for the IAB node.

Therefore, with reference to the configuration information of the first PRACH resource and the slot offset, in the parameter in the fourth column in Table 3, numbers of the slots that are configured by the upper-level node for the IAB node and in which the PRACH resource exists are actually 3, 7, 11, 15, 18, 23, 27, 31, 35, and 38.

It should be understood that the slot offset −1 provided in this embodiment of this application is merely an example, and the slot offset may alternatively be another integer value. For example, the slot offset is −2. That −1 indicates moving forward by one slot is also an example, and −1 may alternatively indicate moving backward by one slot. Specifically, moving forward or backward is not limited in this application.

Optionally, if the upper-level node or the donor node indicates the system frame offset mentioned above, the slot offset in this embodiment of this application may coexist with the indication of the system frame offset. The IAB node may alternatively determine a location of the second PRACH resource based on indications of both the system frame offset and the slot offset. For example, if the PRACH resources on the two links collide in each system frame, the location of the second PRACH resource may be determined based on the slot offset. If the PRACH resources on the two links collide in some system frames, the PRACH resource may be offset based on only the system frame offset, or based on the system frame offset and the slot offset, or based on only the slot offset.

Optionally, if the second network device that sends the slot offset is the upper-level node of the IAB node, before determining the PRACH resource (namely, the second PRACH resource) on the link between the upper-level node and the IAB node, the upper-level node may receive the indication of the slot offset and the information about the collision slot or the configuration information of the third PRACH resource that are sent by the donor node. A method for determining, by the upper-level node, a location of the resource (namely, the second PRACH resource) for receiving the random access request sent by the IAB node may be the same as the method for determining the second PRACH resource by the IAB node.

In another possible implementation, the upper-level node may not send information about the slot offset, but only indicate, to the IAB node, slots or system frames in which the first PRACH resource is unavailable. Content in Table 3 is used as an example. After indicating the IAB node to use the PRACH resource corresponding to the PRACH configuration index 1, the donor node or the upper-level node also indicates, to the IAB node, that PRACH resources in the slot #19 and the slot #39 are unavailable. The IAB node may use the first PRACH resource in a slot other than the slot #19 and the slot #39. A case in which the upper-level node indicates an unavailable system frame is similar to this case. Details are not described herein by using an example. Alternatively, that the collision slot is not used for the PRACH resource of the first network device on the backhaul link may be defined in a protocol, and does not need to be explicitly notified through signaling.

In the foregoing embodiment, the slot-level offset is introduced, so that when receiving, on the third PRACH resource, the random access request sent by the UE or the child node of the IAB node, the IAB node does not send the random access request to the upper-level node or the donor node. In other words, the slots in which the IAB node receives the random access request do not overlap the slots in which the IAB node sends the random access request. In this way, a resource collision can be avoided for the IAB node in the slots in which the PRACH resources exist. This satisfies a half-duplex constraint on the IAB node.

In the foregoing two embodiments, the first PRACH resource is enabled to not collide with the third PRACH resource at the slot-level time domain location. Alternatively, the first PRACH resource may be enabled to not collide with the third PRACH resource at a symbol-level time domain location. The following provides detailed descriptions by using Table 4 and FIG. 7 as an example.

Figure 7:
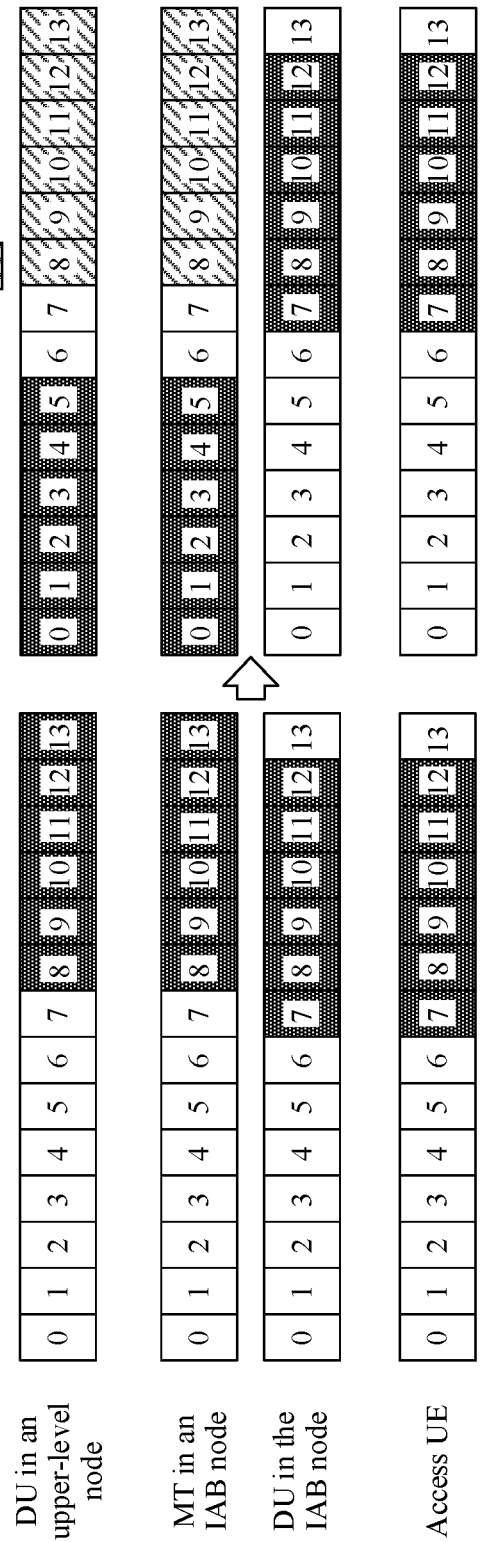
FIG. 7 is a schematic diagram of communication resources according to another embodiment of this application.
Figure 8:
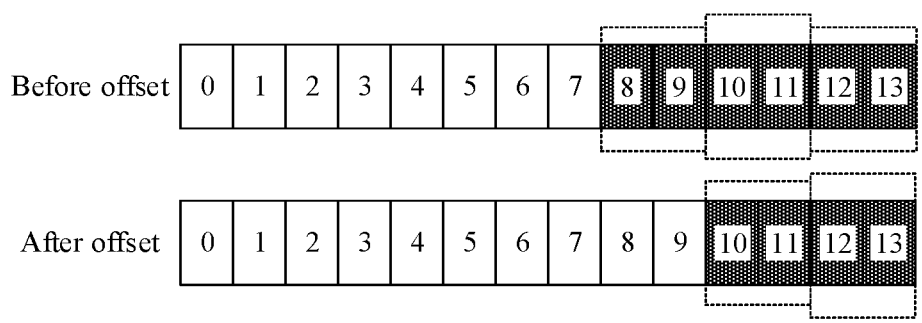
FIG. 8 is a schematic diagram of communication resources according to still another embodiment of this application.

FIG. 7 is a schematic diagram of communication resources according to still another embodiment of this application. In FIG. 7, it is assumed that a same waveform parameter, for example, a subcarrier spacing, is used for an access link and a backhaul link. PRACH configuration indexes and other configuration information corresponding to the communication resources are shown in Table 4. In this embodiment, location adjustment information includes a symbol offset.

PRACH configuration index 78 corresponds to configuration information of a third PRACH resource. The first PRACH resource is an initial PRACH resource configured by a second network device for the first network device, and the third PRACH resource is a PRACH resource configured by the first network device for the UE or a child node of the first network device. The first network device may receive, on the third PRACH resource, a random access request sent by the UE or the child node of the first network device. For ease of description, in this embodiment of this application, an example in which the first network device is an IAB node is used for description, and the second network device may be the upper-level node of the IAB node or the donor node.

For example, a specific procedure in this embodiment is as follows.

Step 1: The IAB node may receive a system message broadcast by the upper-level node or receive an RRC configuration sent by the upper-level node or the donor node, to obtain the configuration information of the first PRACH resource. Specifically, an MT function of the IAB node receives the foregoing configuration.

Step 2: The IAB node receives the symbol offset sent by the upper-level node or the donor node. In this embodiment of this application, it is assumed that the symbol offset is −8. Specifically, when the second network device is the upper-level node of the IAB node, the symbol offset may be sent by the upper-level node, or may be sent by the donor node. When the second network device is the donor node, in other words, the upper-level node of the IAB node is the donor node, the symbol offset is sent by the donor node. The symbol offset may be determined by the donor node, and then notified by the donor node to the upper-level node of the IAB node or the IAB node.

Step 3: The IAB node determines, based on the received configuration information of the first PRACH resource, a number that is of a slot in which a PRACH resource is configured and that is indicated by the configuration information of the first PRACH resource. The IAB node determines, based on the symbol offset received in step 2, a time domain location of a PRACH resource (namely, the second PRACH resource) actually configured by the upper-level node or the donor node.

Optionally, the IAB node may offset all resources in the first PRACH resource. In this case, in this step, the IAB node

TABLE 4

PRACH configuration indexes (102 and 78) and corresponding PRACH configuration information

| First column PRACH configuration index | Second column Preamble format | Third column $n_{SFN}$ mod x = y | | Fourth column Slot number | Fifth column Mapping start symbol | Sixth column Quantity of PRACH slots with a subcarrier spacing of 60 kHz | Seventh column Quantity $N_t^{RA,slot}$ of PRACH occasions in one PRACH slot | Eighth column PRACH duration $N_{dur}^{RA}$ |
|---|---|---|---|---|---|---|---|---|
| | | x | y | | | | | |
| 78 | A3 | 1 | 0 | 23, 27, 31, 35, and 39 | 7 | 1 | 1 | 6 |
| 102 | B1 | 1 | 0 | 23, 27, 31, 35, and 39 | 8 | 1 | 3 | 2 |

As shown in Table 4, the PRACH configuration indexes 78 and 102 and the corresponding PRACH configuration information are listed as examples. For ease of description, in this embodiment of this application, it is assumed that a PRACH configuration index broadcast by a first network device to UE is 78, and a PRACH configuration index that is sent by an upper-level node or a donor node and that is received by the first network device is 102. In other words, the PRACH configuration index 102 corresponds to configuration information of a first PRACH resource, and the may not need to obtain a slot or symbol in which the third PRACH resource is located. However, for better understanding of the technical solutions in this embodiment of this application, Table 4 and FIG. 7 each show symbol locations of the third PRACH resource. However, it should be understood that determining the symbol locations of the third PRACH resource is an optional step in this embodiment.

It can be learned from information in the third column in Table 4 that, in the foregoing two PRACH resource configurations, x=1, y=0, and the PRACH resources overlap in each system frame. Further, it can be learned from a parameter in the fourth column that the two PRACH resources (namely, the first PRACH resource and the third PRACH resource) overlap in slots #23, #27, #31, #35, and #39. Further, it can be learned from parameters in the fifth column to the eighth column that, in any one of the foregoing overlap slots, the first PRACH resource occupies a total of six symbols: a symbol #8 to a symbol #13, in other words, occupies three consecutive PRACH occasions; and the third PRACH resource occupies a total of six symbols: a symbol #7 to a symbol #12, in other words, occupies three consecutive PRACH occasions. In one slot, symbol locations of the first PRACH resource and the third PRACH resource are shown in FIG. 7.

In FIG. 7, the first row or the second row shows the symbol locations of the first PRACH resource corresponding to the PRACH configuration index 102 in one overlap slot, where the first PRACH resource is configured in the symbol #8 to the symbol #13 (which are at symbol locations filled with dots in the first row or the second row on the left in FIG. 7); and the third row or the fourth row shows the symbol locations of the third PRACH resource corresponding to the PRACH configuration index 78 in one overlap slot, where the third PRACH resource is configured in the symbol #7 to the symbol #12 (which are at symbol locations filled with dots in the third row or the fourth row on the left in FIG. 7). It can be learned that the first PRACH resource collides with the third PRACH resource in the symbol #8 to the symbol #12.

It should be noted that in FIG. 7, the first row shows symbol locations of a PRACH resource configured by a DU function of the upper-level node for the IAB node, and the second row shows symbol locations of a PRACH resource received by an MT function of the IAB node. The PRACH resource used by the upper-level node to receive a random access request is the same as the PRACH resource used by the IAB node to send the random access request to the upper-level node, and both are the first PRACH resources corresponding to the PRACH configuration index 102 in Table 4. Similarly, in FIG. 7, the third row shows symbol locations of a PRACH resource configured by a DU function of the IAB node for the UE, and the fourth row shows symbol locations of a PRACH resource received by the UE. The PRACH resource used by the IAB node to receive the random access request sent by the UE is the same as the PRACH resource used by the UE to send the random access request to the IAB node, and both are the third PRACH resources corresponding to the PRACH configuration index 78 in Table 4. For ease of understanding, only the symbol locations of the first PRACH resource that is received by the MT function of the IAB node and that is configured by the upper-level node and the symbol locations of the third PRACH resource that is configured by the DU function of the IAB node for the UE are used as examples for description below.

The symbols that are shown in the second row and in which the first PRACH resource is configured are offset based on the symbol offset −8. The symbol offset −8 indicates moving the symbols in which the first PRACH resource is located forward by eight symbols. To be specific, in the second row on the right in FIG. 7, the first PRACH resource in the symbol #8 to the symbol #13 (which are at the symbol locations filled with slashes in the second row on the right in FIG. 7) is offset to a symbol #0 to a symbol #5 (which are at the symbol locations filled with dots in the second row on the right in FIG. 7). In other words, the PRACH resource in the symbol #0 to the symbol #5 is the second PRACH resource determined by the IAB node, namely, a PRACH resource actually configured by the upper-level node for the IAB node.

Therefore, with reference to the configuration information of the first PRACH resource and the symbol offset, in the parameter in the fifth column in Table 4, a start number of the symbols that are configured by the upper-level node for the IAB node and in which the PRACH resource exists is actually 0.

It should be understood that the symbol offset −8 provided in this embodiment of this application is merely an example, and the symbol offset may alternatively be another integer value.

In the foregoing embodiment, the first PRACH resource and the third PRACH resource collide in all slots. Therefore, the symbols that are in all the slots and in which the first PRACH resource exists may be offset. In some other embodiments, if the first PRACH resource and the third PRACH resource overlap/collide only in some slots, the symbol offset may be valid only for the slots in which a PRACH resource collision occurs. For example, the symbols that are in the collision slots and in which the first PRACH resource exists may be offset based on the symbol offset, and the first PRACH resource in a slot in which no collision occurs is not offset. In this case, the second PRACH resource includes a resource that is in the first PRACH resource and that has been offset and a resource that is in the first PRACH resource and that is not offset. The collision slot may be indicated by the upper-level node, or may be determined by the IAB node.

Optionally, the location adjustment information may include an offset of a start symbol index of a PRACH occasion. For example, the entire PRACH occasion may be offset based on the offset of the start symbol index of the PRACH occasion, and each collision symbol does not need to be separately offset.

In some embodiments, a symbol in which the first PRACH resource is located may be moved beyond a current slot. The symbol or a PRACH occasion moved beyond the current slot may be considered as invalid, to avoid impact on a resource in another slot. In a schematic diagram of communication resources shown in FIG. 8, the first row shows symbol locations of PRACH resources before offset, and the PRACH resources occupy a symbol #8 to a symbol #13. If the symbol offset is 2, the PRACH resources in the symbol #8 to the symbol #13 need to be offset to a symbol #10 to the symbol #13 in the current slot, and a symbol #0 and a symbol #1 in a next slot. In this case, PRACH resources that are offset to the symbol #0 and the symbol #1 in the next slot may be considered as invalid. In the current slot, a quantity of occasions in which the PRACH resources are valid changes from 3 to 2.

In the foregoing embodiment, the symbol-level offset is introduced, so that when receiving, on the third PRACH resource, the random access request sent by the UE or the child node of the IAB node, the IAB node does not send the random access request to the upper-level node or the donor node. In other words, the symbols in which the IAB node receives the random access request do not overlap the symbols in which the IAB node sends the random access request. In this way, a resource collision can be avoided for the IAB node in the symbols in which the PRACH resources exist. This satisfies a half-duplex constraint on the IAB node.

In the foregoing embodiment, the first PRACH resource in the symbols is offset, so that the first PRACH resource does not collide with the third PRACH resource at the time domain location. In some embodiments, if the first PRACH resource is configured to occupy one entire slot or a preamble is in a long format, the method for offsetting resources in symbols in one slot has a limited effect. For example, the long-format preamble may occupy a maximum of six symbols. If there are two long-format random access occasions in one slot, 12 of 14 symbols are occupied. In this case, in an embodiment of this application, the IAB node may alternatively be indicated to use a PRACH resource in a valid symbol, so that the first PRACH resource does not collide with the third PRACH resource at the time domain location. The following provides detailed descriptions with reference to Table 5 and FIG. 9.

application, it is assumed that symbol index is (1, 2, 3), which indicates valid PRACH occasions in one slot.

Figure 9:
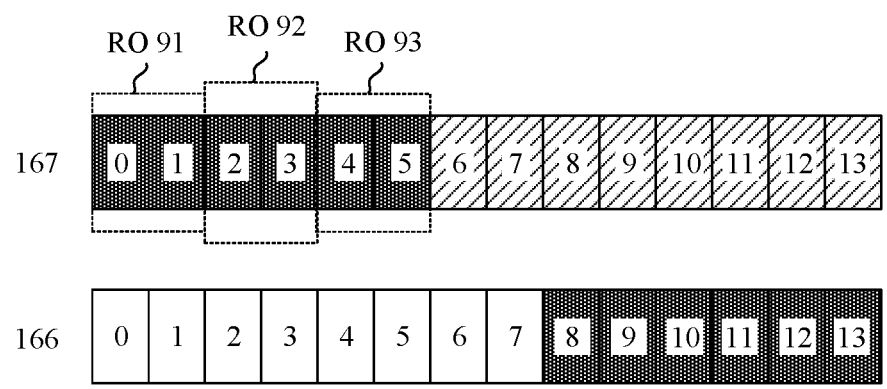
FIG. 9 is a schematic diagram of communication resources according to still another embodiment of this application.

For better understanding of the technical solutions in this embodiment of this application, Table 5 and FIG. 9 each show symbol locations of the third PRACH resource. However, it should be understood that determining the symbol locations of the third PRACH resource is an optional step in this embodiment.

It can be learned from information in the third column in Table 5 that, in the foregoing two PRACH resource configurations, x=1, y=0, and the PRACH resources overlap in each system frame. Further, it can be learned from a param-

TABLE 5

PRACH configuration indexes (166 and 167) and corresponding PRACH configuration information

| First column PRACH configuration index | Second column Preamble format | Third column $n_{SFN}\bmod x = y$ x | | Fourth column Slot number | Fifth column Mapping start symbol | Sixth column Quantity of PRACH slots with a subcarrier spacing of 60 kHz | Seventh column Quantity $N_t^{RA,slot}$ of PRACH occasions in one PRACH slot | Eighth column PRACH duration $N_{dur}^{RA}$ |
|---|---|---|---|---|---|---|---|---|
| | | x | y | | | | | |
| 166 | C0 | 1 | 0 | 4, 9, 14, 19, 24, 29, 34, and 39 | 8 | 1 | 3 | 2 |
| 167 | C0 | 1 | 0 | 4, 9, 14, 19, 24, 29, 34, and 39 | 0 | 1 | 7 | 2 |

As shown in Table 5, the PRACH configuration indexes 166 and 167 and the corresponding PRACH configuration information are listed as examples. For ease of description, in this embodiment of this application, it is assumed that a same waveform parameter, for example, a subcarrier spacing, is used for an access link and a backhaul link of a first network device; and a PRACH configuration index broadcast by the first network device to UE is 166, and a PRACH configuration index that is sent by an upper-level node or a donor node and that is received by the first network device is 167. In other words, the PRACH configuration index 167 corresponds to configuration information of a first PRACH resource, and the PRACH configuration index 166 corresponds to configuration information of a third PRACH resource. The first PRACH resource is an initial PRACH resource configured by a second network device for the first network device, and the third PRACH resource is a PRACH resource configured by the first network device for the UE or a child node of the first network device. The first network device may receive, on the third PRACH resource, a random access request sent by the UE or the child node of the first network device. For ease of description, in this embodiment of this application, an example in which the first network device is an IAB node is used for description, and the second network device may be the upper-level node of the IAB node or the donor node.

For example, a specific procedure in this embodiment is as follows.

Step 1: The IAB node may receive a system message broadcast by the upper-level node or receive an RRC configuration sent by the upper-level node or the donor node, to obtain the configuration information of the first PRACH resource. Specifically, an MT function of the IAB node receives the foregoing configuration.

Step 2: The IAB node receives a symbol index configured by the upper-level node or the donor node, where the symbol index is used to indicate the IAB node to use only a PRACH resource in a PRACH occasion that is indicated by the symbol index to be valid. In this embodiment of this eter in the fourth column that the two PRACH resources (namely, the first PRACH resource and the third PRACH resource) overlap in slots #4, #9, #14, #19, #24, #29, #34, and #39. Further, it can be learned from parameters in the fifth column to the eighth column that, in any one of the foregoing overlap slots, the first PRACH resource occupies a total of 14 symbols: a symbol #0 to a symbol #13, in other words, occupies seven consecutive PRACH occasions; and the third PRACH resource occupies a total of six symbols: a symbol #8 to the symbol #13, in other words, occupies three consecutive PRACH occasions. In one slot, symbol locations of the first PRACH resource and the third PRACH resource are shown in FIG. 9.

In FIG. 9, the first row shows the symbol locations of the first PRACH resource corresponding to the PRACH configuration index 167 in one overlap slot, where the first PRACH resource is configured in the symbol #0 to the symbol #13; and the second row shows the symbol locations of the third PRACH resource corresponding to the PRACH configuration index 166 in one overlap slot, where the third PRACH resource is configured in the symbol #8 to the symbol #13 (which are at symbol locations filled with dots in the second row in FIG. 9). It can be learned that the first PRACH resource collides with the third PRACH resource in the symbol #8 to the symbol #13.

Based on the valid PRACH occasions (1, 2, 3) indicated by the symbol index, the IAB node may perform mapping only by using the first three PRACH occasions shown in the first row in FIG. 9, namely, an RO 91, an RO 92, and an RO 93, and does not use a symbol #6 to the symbol #13 in the overlap slot. In other words, the PRACH resource in the symbol #0 to a symbol #5 is the second PRACH resource determined by the IAB node, namely, a PRACH resource actually configured by the upper-level node for the IAB node.

It should be understood that (1, 2, 3) indicated by the symbol index provided in this embodiment of this application is merely an example, and the symbol index may alternatively be another value, for example, (2, 3) or (5).

It should be further understood that (1, 2, 3) indicated by the symbol index in this embodiment of this application indicates that the first three PRACH occasions in one slot are valid. If the symbol index indicates (5), it indicates that the fifth PRACH occasion in one slot is valid.

In another possible implementation, the symbol index may alternatively indicate an invalid PRACH occasion in one slot, and the IAB node may use another symbol beyond the PRACH occasion indicated by the symbol index.

In the foregoing embodiment, the first PRACH resource and the third PRACH resource collide in all slots. Therefore, the valid PRACH occasions indicated by the symbol index may be used in all the slots. In some other embodiments, if the first PRACH resource and the third PRACH resource overlap/collide only in some slots, the symbol index may be valid only for the slots in which a PRACH resource collision occurs. For example, the IAB node may use a valid PRACH occasion in the collision slot, and may use to PRACH resource in a slot in which no collision occurs. In this case, the second PRACH resource includes the valid PRACH resource in the collision slot and the PRACH resource in another slot in which no collision occurs. The collision slot may be indicated by the upper-level node, or may be determined by the IAB node.

In still another possible implementation, the symbol index may not indicate the PRACH occasion, but indicate a valid symbol, an invalid symbol, an index of an available symbol, or an index of an unavailable symbol. A specific implementation is the same as the manner in which the symbol index indicates the valid or invalid PRACH occasion. Details are not described herein again.

Similarly, the location adjustment information may further be used to indicate a valid slot in slots in which the first PRACH resource is configured, and the IAB node may use only the first PRACH resource in the valid slot.

In another possible implementation, the location adjustment information includes an offset type indication. The offset type indication is used to indicate whether the offset indicates a slot offset or a symbol offset. In different offset methods in the foregoing embodiments, it is necessary for the first network device to know whether the offset is performed based on slots or symbols, so as to ensure consistency of PRACH resource configuration.

In the foregoing embodiment, the symbol index of the PRACH resource indicates the IAB node to use the valid PRACH resource, where the first PRACH resource does not collide with the third PRACH resource in the valid symbol or PRACH occasion indicated by the symbol index. In this way, the symbols in which the IAB node receives the random access request do not overlap the symbols in which the IAB node sends the random access request. This can avoid a resource collision for the IAB node in the symbols in which the PRACH resources exist, to satisfy a half-duplex constraint on the IAB node.

The foregoing describes in detail the method embodiments in the embodiments of this application with reference to FIG. 1 to FIG. 9. The following describes in detail apparatus embodiments in the embodiments of this application with reference to FIG. 10 to FIG. 15. It should be understood that the descriptions of the method embodiments correspond to descriptions of the apparatus embodiments. Therefore, for parts that are not described in detail, refer to the foregoing method embodiments.

Figure 10:
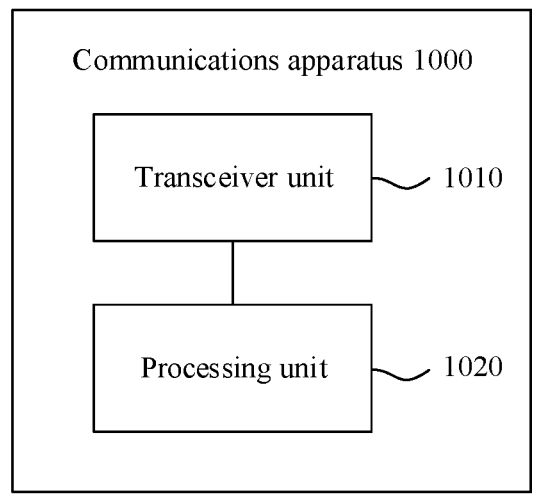
FIG. 10 is a schematic structural diagram of a communications apparatus according to an embodiment of this application.

FIG. 10 is a schematic structural diagram of a communications apparatus according to an embodiment of this application. The communications apparatus 1000 in FIG. 10 may be the first network device mentioned above, and may be a specific example of the relay station 120 in FIG. 1 or FIG. 2, for example, an IAB child node. The apparatus shown in FIG. 10 may be configured to implement the method performed by the first network device. Specifically, the communications apparatus 1000 may be configured to perform the method in FIG. 4, and may specifically implement the embodiments shown in FIG. 5 to FIG. 9. To avoid redundancy, details are not described again.

The communications apparatus 1000 shown in FIG. 10 includes a transceiver unit 1010 and a processing unit 1020.

The transceiver unit 1010 is configured to receive configuration information of a first physical random access channel PRACH resource.

The transceiver unit 1010 is further configured to receive location adjustment information, where the location adjustment information is used to indicate to adjust a location of at least a part of the first PRACH resource in slots or symbols.

The processing unit 1020 is configured to determine a second PRACH resource based on the configuration information of the first PRACH resource and the location adjustment information.

The transceiver unit 1010 is further configured to send a random access request to a second network device on the second PRACH resource.

Optionally, the location adjustment information includes a slot or symbol offset, and the processing unit 1020 is specifically configured to offset at least the part of the first PRACH resource based on the slot or symbol offset, to obtain the second PRACH resource.

Optionally, the second PRACH resource is obtained after all resources in the first PRACH resource are offset based on the slot or symbol offset.

Optionally, the location adjustment information further includes location information of a target slot or symbol, and the processing unit 1020 is specifically configured to offset a PRACH resource in the target slot or symbol to obtain the second PRACH resource, where the second PRACH resource includes the resource that is in the first PRACH resource and that has been offset and a resource that is in the first PRACH resource and that is not offset.

Optionally, the processing unit 1020 is specifically configured to determine a target slot or symbol in which the first PRACH resource collides with a third PRACH resource in time domain, where the third PRACH resource is used by the first network device to receive a random access request; and the processing unit 1020 is specifically configured to offset a PRACH resource in the target slot or symbol to obtain the second PRACH resource, where the second PRACH resource includes the resource that is in the first PRACH resource and that has been offset and a resource that is in the first PRACH resource and that is not offset.

Optionally, the location adjustment information includes a slot index and/or a symbol index, and the slot index and/or the symbol index are/is used to indicate that at least a part of the first PRACH resource is valid; and the processing unit 1020 is specifically configured to determine at least the part that is of the first PRACH resource and that is indicated by the slot index or the symbol index, as the second PRACH resource.

Optionally, the configuration information of the first PRACH resource is carried in a system broadcast message or a radio resource control configuration message.

Figure 11:
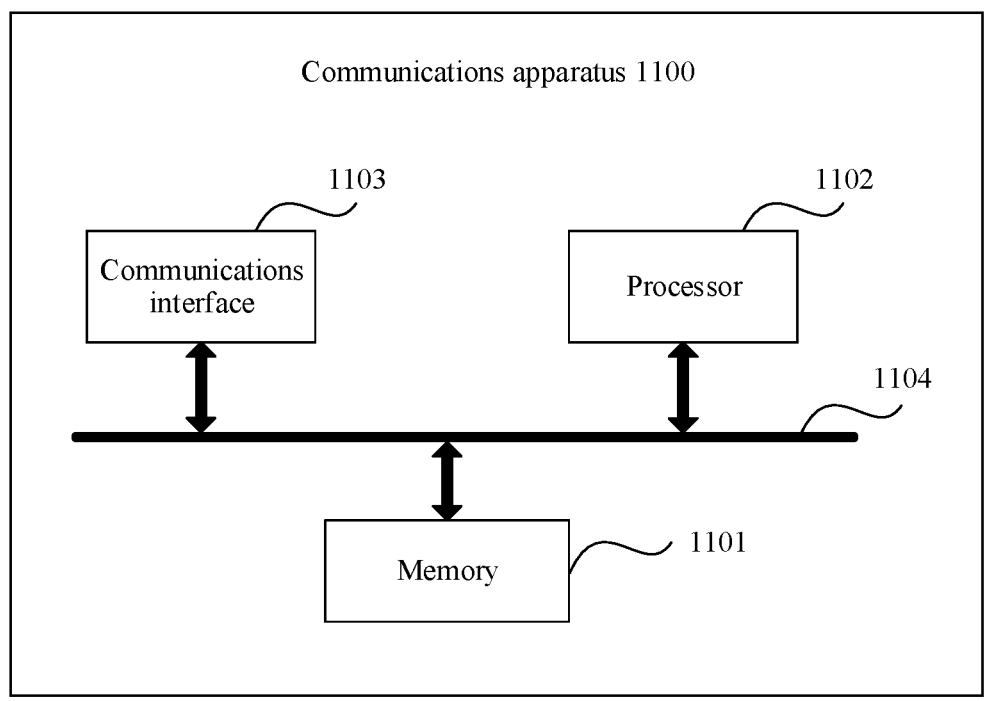
FIG. 11 is a schematic structural diagram of a communications apparatus according to an embodiment of this application.

FIG. 11 is a schematic structural diagram of a communications apparatus according to an embodiment of this application. The communications apparatus 1100 shown in FIG. 11 may correspond to the first network device described above. The communications apparatus 1100 includes a processor 1102. In this embodiment of this application, the processor 1102 is configured to control and manage an action of the first network device. For example, the processor 1102 is configured to support the first network device in performing the methods, operations, or functions shown in FIG. 5 to FIG. 9 in the foregoing embodiments, and is configured to support receiving of the location adjustment information and determining of the second PRACH resource based on the location adjustment information in the foregoing embodiments. Optionally, the first network device may further include a memory 1101 and a communications interface 1103. The processor 1102, the communications interface 1103, and the memory 1101 may be connected to each other, or may be connected to each other through a bus 1104. The communications interface 1103 is configured to support the first network device in performing communication, and the memory 1101 is configured to store program code and data of the first network device. The processor 1102 invokes the code stored in the memory 1101 to perform control management. The memory 1101 may be coupled to or not coupled to the processor.

The processor 1102 may be a central processing unit, a general-purpose processor, a digital signal processor, an application-specific integrated circuit, a field programmable gate array or another programmable logic device, a transistor logic device, a hardware component, or any combination thereof. The processor 1102 may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. The bus 1104 may be a peripheral component interconnect (peripheral component interconnect, PCI) bus, an extended industry standard architecture (extended industry standard architecture, EISA) bus, or the like. The bus may be classified as an address bus, a data bus, a control bus, or the like. For ease of representation, only one thick line is used to represent the bus in FIG. 11, but this does not mean that there is only one bus or only one type of bus.

Figure 12:
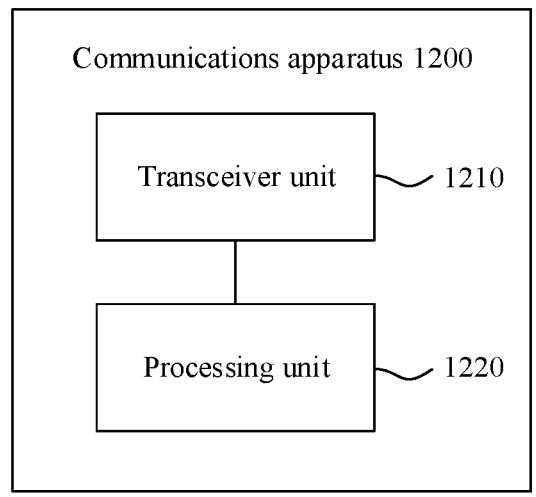
FIG. 12 is a schematic structural diagram of a communications apparatus according to another embodiment of this application.

FIG. 12 is a schematic structural diagram of a communications apparatus according to an embodiment of this application. The communications apparatus 1200 in FIG. 12 may be the second network device mentioned above, and may be a specific example of the donor node 110 in FIG. 1 or FIG. 2. The apparatus shown in FIG. 12 may be configured to implement the method performed by the second network device. Specifically, the communications apparatus 1200 may be configured to perform the method in FIG. 4, and may specifically implement the embodiments shown in FIG. 5 to FIG. 9. To avoid redundancy, details are not described again.

The communications apparatus 1200 shown in FIG. 12 includes a transceiver unit 1210 and a processing unit 1220.

The processing unit 1220 is configured to obtain location adjustment information, where the location adjustment information is used to indicate to adjust a location of at least a part of a first physical random access channel PRACH resource in slots or symbols.

The transceiver unit 1210 is configured to send the location adjustment information to a first network device.

Optionally, the communications apparatus is a donor node.

Optionally, the processing unit 1220 is specifically configured to determine the location adjustment information and/or a second PRACH resource based on configuration information of the first PRACH resource and configuration information of a third PRACH resource, where the third PRACH resource is used by the first network device to receive a random access request, and the second PRACH resource is used to receive a random access request sent by the first network device.

Optionally, the location adjustment information includes at least one of the following information: a slot offset, a symbol offset, a slot index, or a symbol index.

Optionally, the transceiver unit 1210 is configured to send the configuration information of the third PRACH resource to the first network device.

Optionally, the transceiver unit 1210 is configured to send the configuration information of the third PRACH resource to an upper-level node of the first network device.

Optionally, the transceiver unit 1210 is configured to send the location adjustment information to the first network device.

Optionally, the transceiver unit 1210 may be further configured to send the location adjustment information to the upper-level node of the first network device.

Optionally, the transceiver unit 1210 is specifically configured to send the location adjustment information to the first network device through an F1AP interface, a radio resource control RRC message, or a media access control control element MAC CE.

Figure 13:
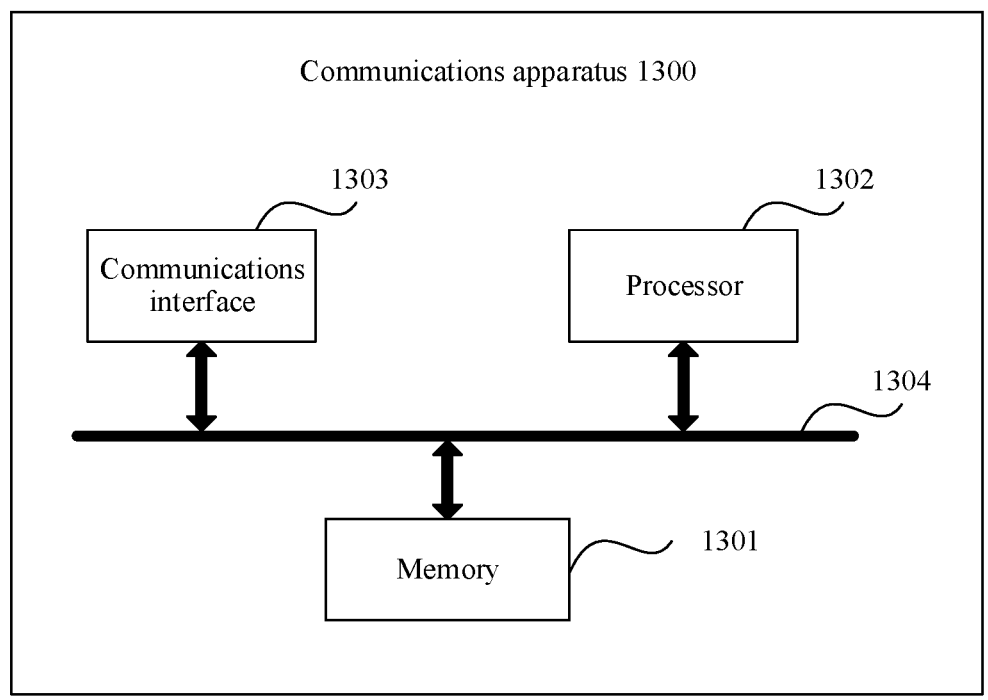
FIG. 13 is a schematic structural diagram of a communications apparatus according to another embodiment of this application.

FIG. 13 is a schematic structural diagram of a communications apparatus according to an embodiment of this application. The communications apparatus 1300 shown in FIG. 13 may correspond to the foregoing case in which the second network device is the donor node. The communications apparatus 1300 includes a processor 1302. In this embodiment of this application, the processor 1302 is configured to control and manage an action of the second network device. For example, the processor 1302 is configured to support the second network device in performing the methods, operations, or functions shown in FIG. 5 to FIG. 9 in the foregoing embodiments, and is configured to support the second network device in obtaining the location adjustment information or determining the second PRACH resource in the foregoing embodiments. Optionally, the second network device may further include a memory 1301 and a communications interface 1303. The processor 1302, the communications interface 1303, and the memory 1301 may be connected to each other, or may be connected to each other through a bus 1304. The communications interface 1303 is configured to support the second network device in performing communication, and the memory 1301 is configured to store program code and data of the second network device. The processor 1302 invokes the code stored in the memory 1301 to perform control management. The memory 1301 may be coupled to or not coupled to the processor.

The processor 1302 may be a central processing unit, a general-purpose processor, a digital signal processor, an application-specific integrated circuit, a field programmable gate array or another programmable logic device, a transistor logic device, a hardware component, or any combination thereof. The processor 1302 may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. The bus 1304 may be a peripheral component interconnect (peripheral component interconnect, PCI) bus, an extended industry standard architecture (extended industry standard architecture, EISA) bus, or the like. The bus may be classified as an address bus, a data bus, a control bus, or the like. For ease of representation, only one thick line is used to represent the bus in FIG. 13, but this does not mean that there is only one bus or only one type of bus.

Figure 14:
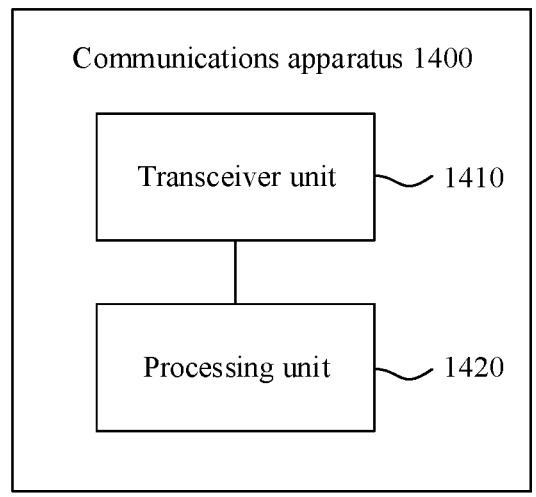
FIG. 14 is a schematic structural diagram of a communications apparatus according to still another embodiment of this application.

FIG. 14 is a schematic structural diagram of a communications apparatus according to an embodiment of this application. The communications apparatus 1400 in FIG. 14 may be the second network device mentioned above, and may be a specific example of the upper-level node of the first network device, for example, another IAB node. The apparatus shown in FIG. 14 may be configured to implement the method performed by the second network device. Specifically, the communications apparatus 1400 may be configured to perform the method in FIG. 4, and may specifically implement the embodiments shown in FIG. 5 to FIG. 9. To avoid redundancy, details are not described again.

The communications apparatus 1400 shown in FIG. 14 includes a transceiver unit 1410 and a processing unit 1420.

The processing unit 1420 is configured to obtain location adjustment information, where the location adjustment information is used to indicate to adjust a location of at least a part of a first physical random access channel PRACH resource in slots or symbols.

The transceiver unit 1410 is configured to send the location adjustment information to the first network device.

Optionally, the communications apparatus is the upper-level node of the first network device.

Optionally, the processing unit 1420 is specifically configured to determine the location adjustment information based on configuration information of the first PRACH resource and configuration information of a third PRACH resource, where the third PRACH resource is used by the first network device to receive a random access request; and the transceiver unit 1410 is specifically configured to send the location adjustment information to the first network device through a donor node, or the transceiver unit 1410 is specifically configured to directly send the location adjustment information to the first network device.

Optionally, the transceiver unit 1410 is further configured to receive the configuration information that is of the third PRACH resource and that is sent by the donor node or the first network device.

Optionally, the transceiver unit 1410 is specifically configured to receive the location adjustment information sent by a donor node or a core network device.

Optionally, the transceiver unit 1410 is specifically configured to forward, through an air interface, the location adjustment information sent by the donor node or the core network device, or the transceiver unit 1410 is specifically configured to send the location adjustment information to the first network device through an air interface.

Optionally, the location adjustment information includes at least one of the following information: a slot offset, a symbol offset, a slot index, or a symbol index.

Optionally, the processing unit 1420 is further configured to determine a second PRACH resource based on the configuration information of the first PRACH resource and the location adjustment information, where the second PRACH resource is used to receive a random access request sent by the first network device.

Optionally, the location adjustment information includes a slot or symbol offset, and the processing unit 1420 is specifically configured to offset at least the part of the first PRACH resource based on the slot or symbol offset, to obtain the second PRACH resource.

Optionally, the location adjustment information further includes location information of a target slot or symbol, and the processing unit 1420 is specifically configured to offset a PRACH resource in the target slot or symbol to obtain the second PRACH resource, where the second PRACH resource includes the resource that is in the first PRACH resource and that has been offset and a resource that is in the first PRACH resource and that is not offset.

Optionally, the processing unit 1420 is specifically configured to determine a target slot or symbol in which the first PRACH resource collides with the third PRACH resource in time domain, where the third PRACH resource is used by the first network device to receive the random access request; and the processing unit 1420 is specifically configured to offset a PRACH resource in the target slot or symbol to obtain the second PRACH resource, where the second PRACH resource includes the resource that is in the first PRACH resource and that has been offset and a resource that is in the first PRACH resource and that is not offset.

Optionally, the location adjustment information includes a slot index and/or a symbol index, and the slot index and/or the symbol index are/is used to indicate that at least a part of the first PRACH resource is valid; and the processing unit 1420 is specifically configured to determine at least the part that is of the first PRACH resource and that is indicated by the slot index and/or the symbol index, as the second PRACH resource.

Optionally, the transceiver unit 1410 is specifically configured to send the location adjustment information to the first network device through an F1AP interface, a radio resource control RRC message, or a media access control control element MAC CE.

Figure 15:
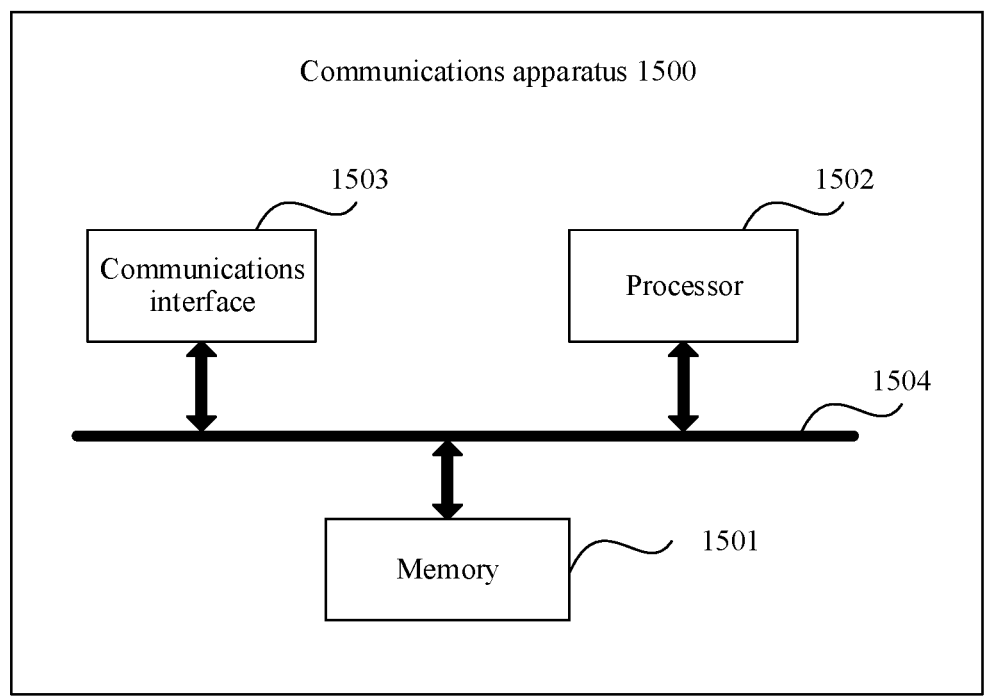
FIG. 15 is a schematic structural diagram of a communications apparatus according to still another embodiment of this application.

FIG. 15 is a schematic structural diagram of a communications apparatus according to an embodiment of this application. The communications apparatus 1500 shown in FIG. 15 may correspond to the foregoing case in which the second network device is the upper-level node of the first network device. The communications apparatus 1500 includes a processor 1502. In this embodiment of this application, the processor 1502 is configured to control and manage an action of the second network device. For example, the processor 1502 is configured to support the second network device in performing the methods, operations, or functions shown in FIG. 5 to FIG. 9 in the foregoing embodiments, and is configured to support the second network device in obtaining the location adjustment information or determining the second PRACH resource in the foregoing embodiments. Optionally, the second network device may further include a memory 1501 and a communications interface 1503. The processor 1502, the communications interface 1503, and the memory 1501 may be connected to each other, or may be connected to each other through a bus 1504. The communications interface 1503 is configured to support the second network device in performing communication, and the memory 1501 is configured to store program code and data of the second network device. The processor 1502 invokes the code stored in the memory 1501 to perform control management. The memory 1501 may be coupled to or not coupled to the processor.

The processor 1502 may be a central processing unit, a general purpose processor, a digital signal processor, an application-specific integrated circuit, a field programmable gate array or another programmable logic device, a transistor logic device, a hardware component, or any combination thereof. The processor 1502 may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. The bus 1504 may be a peripheral component interconnect (peripheral component interconnect, PCI) bus, an extended industry standard architecture (extended industry standard architecture, EISA) bus, or the like. The bus may be classified as an address bus, a data bus, a control bus, or the like. For ease of representation, only one thick line is used to represent the bus in FIG. 15, but this does not mean that there is only one bus or only one type of bus.

A person of ordinary skill in the art may be aware that units, algorithms, and steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely division into logical functions and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, in other words, may be located at one position, or may be distributed on a plurality of network units. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions in this application essentially, or the part contributing to the current technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A random access resource configuration method, comprising:
    receiving, by a first network device, configuration information of a first physical random access channel (PRACH) resource, wherein the first PRACH resource is allocated by a network for the first network device after the first network device accesses the network;
    receiving, by the first network device, location adjustment information, wherein the location adjustment information is used to indicate to adjust a location of at least a part of the first PRACH resource on a slot or a symbol;
    determining, by the first network device, a second PRACH resource based on the configuration information of the first PRACH resource and the location adjustment information; and
    sending, by the first network device, a random access request to a second network device on the second PRACH resource.

2. The method according to claim 1, wherein the location adjustment information comprises a slot offset or a symbol offset.

3. The method according to claim 2, wherein the location adjustment information comprises a system frame offset.

4. The method according to claim 2, wherein the determining, by the first network device, a second PRACH resource based on the configuration information of the first PRACH resource and the location adjustment information comprises:
    offsetting, by the first network device, at least the part of the first PRACH resource based on the slot offset or the symbol offset, to obtain the second PRACH resource.

5. The method according to claim 3, wherein the second PRACH resource is obtained after at least the part of the first PRACH resource is offset based on the system frame offset.

6. The method according to claim 3, wherein the second PRACH resource is obtained after at least the part of the first PRACH resource is offset based on the system frame offset and the slot offset.

7. The method according to claim 2, wherein the slot offset is a positive offset or a negative offset.

8. The method according to claim 1, wherein the location adjustment information further comprises a periodicity, and the periodicity is used to indicate a time interval of using the second PRACH resource by the first network device.

9. The method according to claim 1, wherein the receiving, by the first network device, location adjustment information comprises:
    receiving, by the first network device, the location adjustment information through an F1 application protocol interface, a radio resource control (RRC) message, or a media access control control element (MAC CE).

10. A communications apparatus, comprising:
a transceiver;
a non-transitory memory storage comprising computer-executable instructions; and
one or more processors in communication with the transceiver and to the non-transitory memory storage, wherein the one or more processors execute the computer-executable instructions to cause the communications apparatus to perform operations comprising:
receiving, by the transceiver, configuration information of a first physical random access channel (PRACH) resource, wherein the first PRACH resource is allocated by a network for the communications apparatus after the communications apparatus accesses the network;
receiving, by the transceiver, location adjustment information, wherein the location adjustment information is used to indicate to adjust a location of at least a part of the first PRACH resource on a slot or a symbol;
determining a second PRACH resource based on the configuration information of the first PRACH resource and the location adjustment information; and
sending, by the transceiver, a random access request to a second network device on the second PRACH resource.

11. The communications apparatus according to claim 10, wherein the location adjustment information comprises a slot offset or a symbol offset.

12. The communications apparatus according to claim 11, wherein the location adjustment information comprises a system frame offset.

13. The communications apparatus according to claim 11, wherein the operations further comprise:
offsetting at least the part of the first PRACH resource based on the slot offset or the symbol offset, to obtain the second PRACH resource.

14. The communications apparatus according to claim 12, wherein the second PRACH resource is obtained after at least the part of the first PRACH resource is offset based on the system frame offset.

15. The communications apparatus according to claim 12, wherein the second PRACH resource is obtained after at least the part of the first PRACH resource is offset based on the system frame offset and the slot offset.

16. The communications apparatus according to claim 11, wherein the slot offset is a positive offset or a negative offset.

17. The communications apparatus according to claim 10, wherein the location adjustment information further comprises a periodicity, and the periodicity is used to indicate a time interval of using the second PRACH resource by a first network device.

18. The communications apparatus according to claim 10, wherein the operations further comprise:
receiving, by the transceiver, the location adjustment information through an F1 application protocol interface, a radio resource control (RRC) message, or a media access control control element (MAC CE).

19. A communications apparatus, comprising:
a transceiver;
a non-transitory memory storage comprising computer-executable instructions; and
one or more processors in communication with the transceiver and to the non-transitory memory storage, wherein the one or more processors execute the computer-executable instructions to cause the communications apparatus to perform operations comprising:
obtaining location adjustment information, wherein the location adjustment information is used to indicate to adjust a location of at least a part of a first physical random access channel (PRACH) resource on a slot or a symbol, wherein the first PRACH resource is allocated by a network for a first network device after the first network device accesses the network;
determining a second PRACH resource based on configuration information of the first PRACH resource and the location adjustment information; and
sending, by the transceiver, the location adjustment information to the first network device.

20. A non-transitory, computer-readable storage medium, storing one or more instructions executable by a computer system to perform operations comprising:
receiving, by a first network device, configuration information of a first physical random access channel (PRACH) resource, wherein the first PRACH resource is allocated by a network for the first network device after the first network device accesses the network;
receiving, by the first network device, location adjustment information, wherein the location adjustment information is used to indicate to adjust a location of at least a part of the first PRACH resource on a slot or a symbol;
determining, by the first network device, a second PRACH resource based on the configuration information of the first PRACH resource and the location adjustment information; and
sending, by the first network device, a random access request to a second network device on the second PRACH resource.

* * * * *